US012065340B2

(12) United States Patent
Rosencrance

(10) Patent No.: US 12,065,340 B2
(45) Date of Patent: Aug. 20, 2024

(54) TENSION DRIVEN SCISSOR LIFT

(71) Applicant: Oshkosh Corporation, Oshkosh, WI (US)

(72) Inventor: Devin J. Rosencrance, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 18/143,860

(22) Filed: May 5, 2023

(65) Prior Publication Data

US 2023/0271815 A1 Aug. 31, 2023

Related U.S. Application Data

(63) Continuation of application No. 16/811,272, filed on Mar. 6, 2020, now Pat. No. 11,679,966.

(Continued)

(51) Int. Cl.
*B66F 7/06* (2006.01)
*B66F 7/28* (2006.01)

(Continued)

(52) U.S. Cl.
CPC .......... *B66F 7/0633* (2013.01); *B66F 7/0666* (2013.01); *B66F 7/28* (2013.01); *B66F 11/042* (2013.01); *E04G 1/22* (2013.01)

(58) Field of Classification Search
CPC .... B66F 3/22; B66F 7/06; B66F 7/065; B66F 7/0666; B66F 11/042
See application file for complete search history.

(56) References Cited

U.S. PATENT DOCUMENTS 3,373,844 A * 3/1968 Schafer ..................... E04G 1/22 182/69.5
3,785,462 A 1/1974 Coad et al.

(Continued)

FOREIGN PATENT DOCUMENTS

CN 1919715 A 2/2007
DE 44 05 225 A1 7/1995

(Continued)

OTHER PUBLICATIONS

International Search Report and Written Opinion on PCT/US2020/021364, dated Jun. 16, 2020, 18 pages.

(Continued)

*Primary Examiner* — Tyrone V Hall, Jr.
(74) *Attorney, Agent, or Firm* — Foley & Lardner LLP

(57) ABSTRACT

A lift device includes a base, a platform that is repositionable relative to the base between a fully raised position and a fully lowered position, a scissor assembly coupling the base to the platform, and a booster. The scissor assembly includes a scissor layer including a first scissor arm pivotally coupled to a second scissor arm, a pulley coupled to the scissor layer, a tensile member wrapped around the pulley, and an actuator configured to vary a working length of the tensile member such that the first scissor arm rotates relative to the second scissor arm to move the platform relative to the base. A booster is positioned to engage a portion of the tensile member and apply an upward force on the scissor assembly when the platform is in the fully lowered position.

19 Claims, 11 Drawing Sheets

Related U.S. Application Data

(60) Provisional application No. 62/819,220, filed on Mar. 15, 2019.

(51) Int. Cl.
*B66F 11/04* (2006.01)
*E04G 1/22* (2006.01)

(56) References Cited

U.S. PATENT DOCUMENTS

| | | | |
|---|---|---|---|
| 4,405,116 | A | 9/1983 | Eisenberg |
| 4,585,212 | A | 4/1986 | Yanker |
| 10,472,889 | B1 | 11/2019 | Betz |
| 10,611,347 | B1 | 4/2020 | Archer et al. |
| 10,617,900 | B1 | 4/2020 | Linsmeier et al. |
| 2011/0139549 | A1 | 6/2011 | Bacon |
| 2014/0251726 | A1 | 9/2014 | Ditty et al. |
| 2015/0259185 | A1 | 9/2015 | Ditty |
| 2016/0311253 | A1 | 10/2016 | Palmer et al. |
| 2018/0038517 | A1 | 2/2018 | Ditty et al. |
| 2018/0215597 | A1 | 8/2018 | Linsmeier et al. |
| 2019/0119088 | A1 | 4/2019 | Puszkiewicz et al. |
| 2019/0137006 | A1 | 5/2019 | Ditty et al. |
| 2019/0322512 | A1 | 10/2019 | Puszkiewicz et al. |
| 2019/0359460 | A1 | 11/2019 | Linsmeier et al. |
| 2020/0071996 | A1 | 3/2020 | Betz |
| 2020/0140248 | A1 | 5/2020 | Hackenberg et al. |
| 2020/0140249 | A1 | 5/2020 | Hackenberg et al. |

FOREIGN PATENT DOCUMENTS

| | | | |
|---|---|---|---|
| DE | 20302374 | U1 | 5/2003 |
| EP | 0 279 141 | A | 8/1988 |

OTHER PUBLICATIONS

UBERLINK Lift Platform, shown at https://www.youtube.com/watch?v=_51IPfxjZN8 uploaded on Feb. 4, 2017.

* cited by examiner

TENSION DRIVEN SCISSOR LIFT

CROSS-REFERENCE TO RELATED PATENT APPLICATIONS

This application is a Continuation of U.S. application Ser. No. 16/811,272, filed on Mar. 6, 2020, which claims the benefit of and priority to U.S. Provisional Application No. 62/819,220, filed on Mar. 15, 2019, both which are incorporated herein by reference in their entireties.

BACKGROUND

Certain aerial work platforms, known as scissor lifts, include a frame assembly that supports a platform. The platform is coupled to the frame assembly using a system of linked supports arranged in a crossed pattern, forming a scissor assembly. As the supports rotate relative to one another, the scissor assembly extends or retracts, raising or lowering the platform relative to the frame. Accordingly, the platform moves primarily or entirely vertically relative to the frame assembly. Scissor lifts are commonly used where scaffolding or a ladder might be used, as they provide a relatively large platform from which to work that can be quickly and easily adjusted to a broad range of heights. Scissor lifts are commonly used for painting, construction projects, accessing high shelves, changing lights, and maintaining equipment located above the ground.

SUMMARY

One embodiment relates to a lift device including a base, a platform that is repositionable relative to the base between a fully raised position and a fully lowered position, and a scissor assembly coupling the base to the platform. The scissor assembly includes a first scissor layer including a first scissor arm pivotally coupled to a second scissor arm. The first scissor arm is configured to rotate relative to the second scissor arm about a first middle axis that extends laterally. A first pulley is coupled to the first scissor arm. A tensile member is wrapped around the first pulley and coupled to the second scissor arm. An actuator is configured to vary a working length of the tensile member such that the first scissor arm rotates relative to the second scissor arm to move the platform relative to the base.

Another embodiment relates to a lift device including a base, a platform that is repositionable relative to the base between a fully lowered position and a fully raised position, and a scissor assembly coupling the base to the platform. The scissor assembly includes a first scissor layer including a first inner arm pivotally coupled to a first outer arm and a second scissor layer coupled to the first scissor layer, the second scissor layer including a second inner arm pivotally coupled to a second outer arm. The first inner arm is configured rotate relative to the first outer arm about a first middle axis that extends laterally. The second inner arm is configured to rotate relative to the second outer arm about a second middle axis that extends laterally. The first inner arm is configured to rotate relative to the second outer arm about an end axis. A first pulley is coupled to the first inner arm and centered about the end axis. A second pulley is coupled to the first outer arm and longitudinally offset from the first pulley. A tensile member extends between the first pulley and the second pulley. An actuator is configured to reduce a working length of the tensile member such that the first pulley moves longitudinally relative to the second pulley and the platform moves toward the fully raised position. A booster is coupled to the first scissor layer and configured to engage the tensile member to bias at least one of the first inner arm and the first outer arm in an upward direction when the platform is in the fully lowered position.

Still another embodiment relates to a scissor assembly for a lift device. The scissor assembly includes a first scissor layer including a first scissor arm coupled to a second scissor arm and a second scissor layer including a third scissor arm coupled to a fourth scissor arm. The first scissor arm is configured to rotate relative to the second scissor arm about a first middle axis. The third scissor arm is configured to rotate relative to the fourth scissor arm about a second middle axis. The first scissor arm is coupled to the fourth scissor arm, and the second scissor arm is coupled to the third scissor arm. The first scissor arm is configured to rotate relative to the fourth scissor arm about an end axis. A first pulley is coupled to the first scissor arm and aligned with the end axis. A second pulley is coupled to the first scissor arm and the second scissor arm and aligned with the first middle axis. A third pulley is coupled to the second scissor arm. A tensile member extends directly between the first pulley and the second pulley and directly between the second pulley and the third pulley. An electric actuator is coupled to the tensile member. The first middle axis and the second middle axis are contained within a center plane. The electric actuator is configured to apply a tensile force to the tensile member to move the first pulley and the third pulley toward the center plane.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a scissor lift includes a base, a platform configured to support at least one operator, and a lift assembly coupled to the base and the platform and configured to raise and lower the platform relative to the base. The lift assembly includes a series of scissor layers arranged on top of one another. Each scissor layer includes a pair of inner scissor arms pivotally coupled to a pair of outer scissor arms. The inner scissor arms of each scissor layer are pivotally coupled to the outer scissor arms of the adjacent scissor layers. The bottom scissor layer is coupled to the base, and the top scissor layer is coupled to the platform. One or more actuators rotate the scissor arms relative to one another such that the overall length of the scissor assembly changes, raising and lowering the platform.

Typically, scissor lifts include one or more hydraulic cylinders coupled directly to the scissor arms. The hydraulic cylinders extend or retract in response to receiving a flow of pressurized hydraulic fluid. This extension or retraction causes the cylinders to push directly on the scissor arms, moving the scissor arms relative to one another to extend or retract the scissor assembly. As the lift assembly moves upward, the hydraulic cylinders also move upward, raising the center of gravity of the scissor lift and making it less stable. Additionally, the hydraulic cylinders require a pump, a motor, valves, hoses, and other components to provide and control the pressurized flows of hydraulic fluid to the hydraulic cylinders. These components increase the complexity and cost of the scissor lift and have the potential to leak hydraulic fluid.

The scissor lift described herein utilizes an actuator assembly having one or more cables wrapped around a series of pulleys to extend the lift assembly. The pulleys are coupled to various longitudinally offset locations along each section of the scissor assembly. An end of the cable wraps around the drum, and the drum is coupled to an electric motor that selectively rotates the drum. Accordingly, as the electric motor rotates the drum, the drum imparts a tensile force on the cable, and the pulleys are brought toward the longitudinal center of the lift assembly. This extends the lift assembly, lifting the platform upward.

Figure 1:
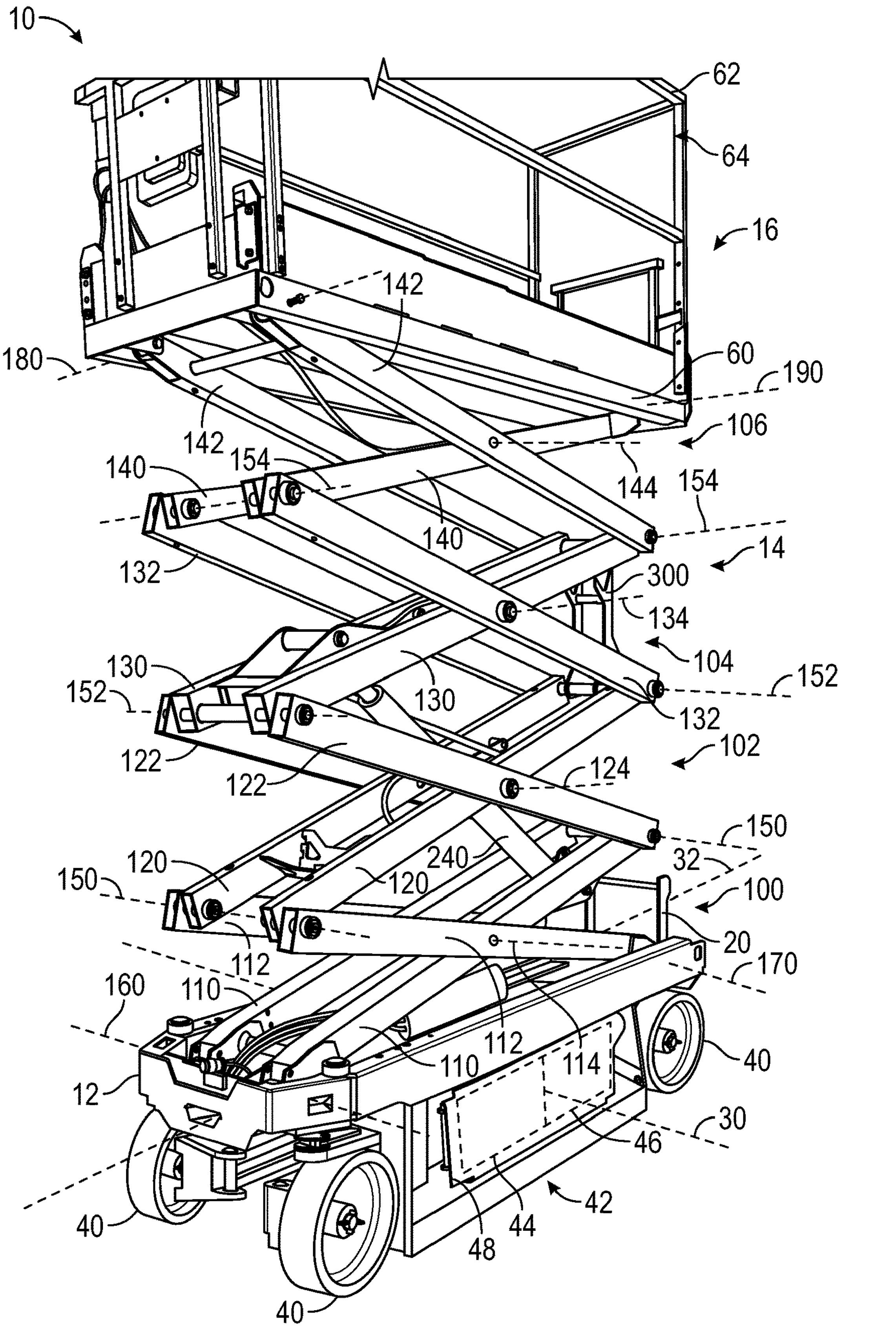
FIG. 1 is a perspective view of a lift device, according to an exemplary embodiment.
Figure 2:
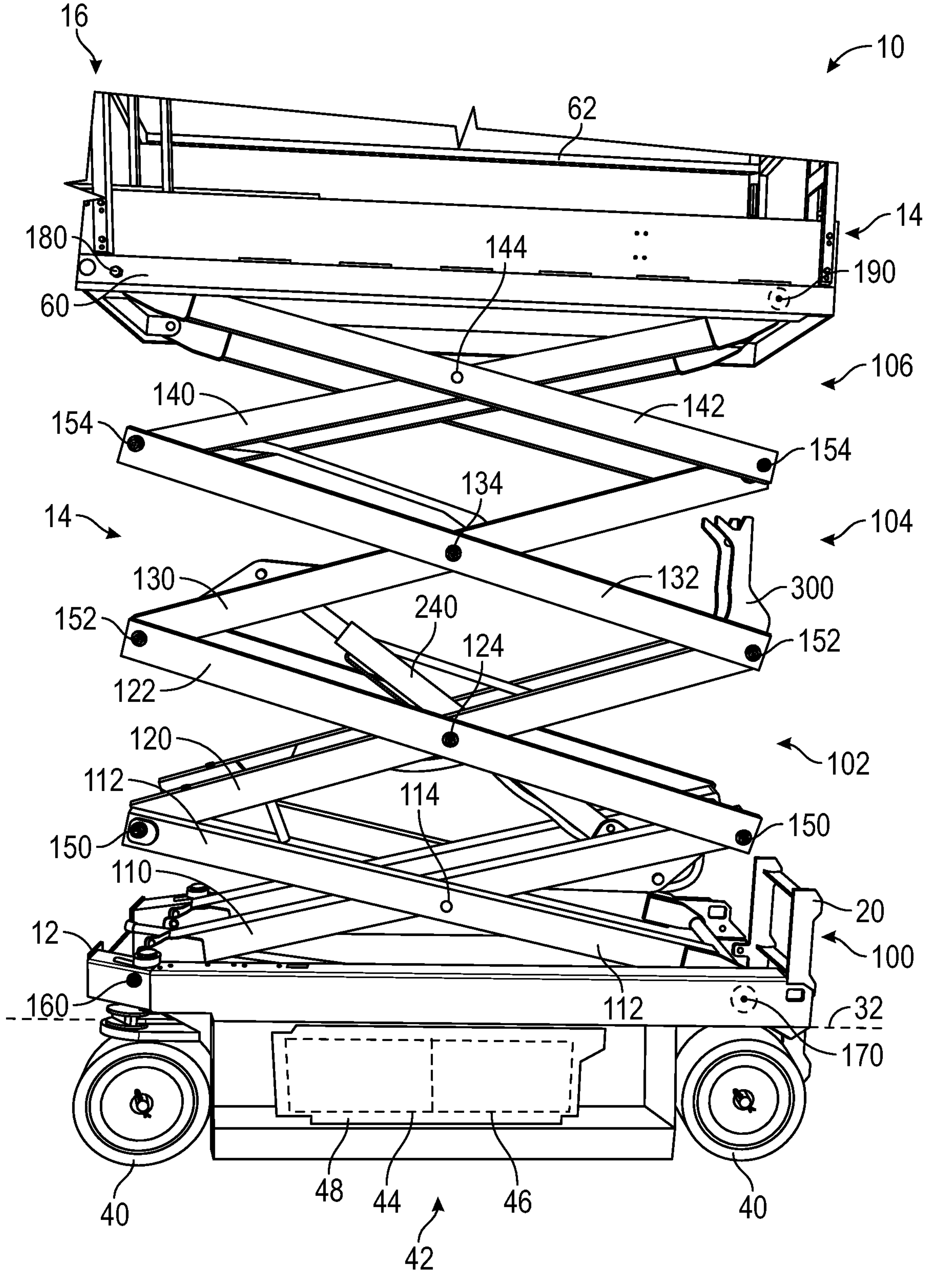
FIG. 2 is a front view of the lift device of FIG. 1.

According to the exemplary embodiment shown in FIGS. 1 and 2, a lift device (e.g., a scissor lift, an aerial work platform, etc.), shown as lift device 10, includes a chassis or base, shown as frame assembly 12. A lift device (e.g., a scissor assembly, etc.), shown as lift assembly 14, couples the frame assembly 12 to a work platform, shown as platform 16. The frame assembly 12 supports the lift assembly 14 and the platform 16, both of which are disposed directly above the frame assembly 12. In use, the lift assembly 14 extends and retracts to raise and lower the platform 16 relative to the frame assembly 12 between a fully lowered position and a fully raised position. The lift device 10 includes an access assembly, shown as an access assembly 20, that is coupled to the frame assembly 12 and configured to facilitate access to the platform 16 from the ground by an operator when the platform 16 is in the fully lowered position.

Referring again to FIGS. 1 and 2, the frame assembly 12 defines a horizontal plane having a lateral axis 30 and a longitudinal axis 32. In some embodiments, the frame assembly 12 is rectangular, defining sides extending parallel to the lateral axis 30 and sides extending parallel to the longitudinal axis 32. In some embodiments, the frame assembly 12 is longer in a longitudinal direction than in a lateral direction. In some embodiments, the lift device 10 is configured to be stationary or semi-permanent (e.g., a system that is installed in one location at a work site for the duration of a construction project). In such embodiments, the frame assembly 12 may be configured to rest directly on the ground and/or the lift device 10 may not provide powered movement across the ground. In other embodiments, the lift device 10 is configured to be moved frequently (e.g., to work on different tasks, to continue the same task in multiple locations, to travel across a job site, etc.). Such embodiments may include systems that provide powered movement across the ground.

The lift device 10 is supported by a plurality of tractive assemblies 40, each including a tractive element (e.g., a tire, a track, etc.), that are rotatably coupled to the frame assembly 12. The tractive assemblies 40 may be powered or unpowered. As shown in FIG. 1, the tractive assemblies 40 are configured to provide powered motion in the direction of the longitudinal axis 32. One or more of the tractive assemblies 40 may be turnable or steerable to steer the lift device 10. In some embodiments, the lift device 10 includes a powertrain system 42. In some embodiments, the powertrain system 42 includes an energy storage device (e.g., a battery, capacitors, ultra-capacitors, etc.), shown as battery 44. Additionally or alternatively, the lift device 10 may be electrically coupled to an outside source of electrical energy (e.g., a power outlet connected to a power grid). In some such embodiments, one or more of the tractive assemblies 40 include an individual motive driver (e.g., an electric motor that is electrically coupled to the energy storage device, etc.) configured to facilitate independently driving one or more of the tractive assemblies 40. The outside source of electrical energy may charge the battery 44 or power the motive drivers directly. In other embodiments, the powertrain system 42 includes a primary driver (e.g., an internal combustion engine, an electric motor) coupled to a pump such that the pump provides pressurized flows of hydraulic fluid to drive the functions of the lift device 10. The powertrain system 42 may additionally or alternatively provide energy (e.g., electrical energy, a flow of hydraulic fluid, etc.) to one or more actuators of the lift device 10 (e.g., the drum assembly 230, etc.). One or more components of the powertrain system 42 may be housed in an enclosure, shown as housing 48. The housing 48 is coupled to the frame assembly 12 and extends from a side of the lift device 10 (e.g., a left or right side). The housing 48 may include one or more doors to facilitate access to components of the powertrain system 42.

Referring to FIG. 1, the platform 16 includes a support surface, shown as deck 60, defining a top surface configured to support operators and/or equipment and a bottom surface opposite the top surface. The bottom surface and/or the top surface extend in a substantially horizontal plane. A thickness of the deck 60 is defined between the top surface and the bottom surface. The bottom surface is coupled to a top end of the lift assembly 14. In some embodiments, the deck 60 is rectangular. In some embodiments, the deck 60 has a footprint that is substantially similar to that of the frame assembly 12.

A series of guards or railings, shown as guard rails 62, extend upwards from the deck 60. The guard rails 62 extend around an outer perimeter of the deck 60, partially or fully enclosing a supported area on the top surface of the deck 60 that is configured to support operators and/or equipment. The guard rails 62 provide a stable support for the operators to hold and facilitate containing the operators and equipment within the supported area. The guard rails 62 define one or more openings 64 through which the operators can access the deck 60. The opening 64 may be a space between two guard rails 62 along the perimeter of the deck 60, such that the guard rails 62 do not extend over the opening 64. Alternatively, the opening 64 may be defined in a guard rail 62 such that the guard rail 62 extends across the top of the opening 64. In some embodiments, the platform 16 includes a door that selectively extends across the opening 64 to prevent movement through the opening 64. The door may rotate (e.g., about a vertical axis, about a horizontal axis, etc.) or translate between a closed position and an open position. In the closed position, the door prevents movement through the opening 64. In the open position, the door does not prevent movement through the opening 64.

The access assembly 20 is coupled to a side of the frame assembly 12. As shown in FIG. 2, the access assembly 20 is a ladder assembly. The access assembly 20 is aligned with the opening 64 such that, when the platform 16 is in the lowered position, the access assembly 20 facilitates access to the upper surface of the deck 60 through the opening 64.

The lift assembly 14 is configured to extend and retract, raising and lowering the platform 16 relative to the frame assembly 12. The lift assembly 14 is selectively repositionable between a fully retracted position and a fully extended position. The fully retracted position corresponds to a fully lowered position of the platform 16. The fully lowered position may be used by an operator when entering or exiting the platform 16 (e.g., using the access assembly 20) or when transporting the lift device 10. The fully extended position corresponds to a fully raised position of the platform 16. The fully raised position and any positions between the fully raised position and the fully lowered position may be used by the operator when accessing an elevated area (e.g., to perform construction work, to visually inspect an elevated object, etc.).

Referring to FIGS. 1-4, the lift assembly 14 includes a series of subassemblies, shown as scissor layers. Specifically, the lift assembly 14 includes a first scissor section, shown as bottom scissor layer 100, a pair of second scissor sections, shown as middle scissor layers 102 and 104, and a third scissor section, shown as top scissor layer 106. In other embodiments, the lift assembly 14 includes more or fewer middle scissor layers (e.g., zero, three, etc.). The bottom scissor layer 100 is directly coupled to the frame assembly 12 and to the middle scissor layer 102. The middle scissor layer 102 is directly coupled to the bottom scissor layer 100 and the middle scissor layer 104. The middle scissor layer 104 is directly coupled to the middle scissor layer 102 and the top scissor layer 106. The top scissor layer 106 is directly coupled to the platform 16 and to the middle scissor layer 104.

Each of the scissor layers includes a pair of first scissor arms or scissor members (e.g., tubular members, solid members, etc.), shown as inner arms, and a pair of second scissor arms or scissor members (e.g., tubular members, solid members, etc.), shown as outer arms. Each inner arm is coupled (e.g., fixedly) to the other inner arm within that scissor layer. Each outer arm is coupled (e.g., fixedly) to the other outer arm within that scissor layer. The inner arms of each scissor layer are pivotally coupled (e.g., by one or more pins or rods) to the corresponding outer arms of that scissor layer near the centers of both the inner arms and the outer arms. Accordingly, the inner arms of each layer pivot relative to the outer arms of that scissor layer about a lateral axis. Specifically, the bottom scissor layer 100 includes inner arms 110 and outer arms 112 that pivot relative to one another about a lateral axis, shown as middle axis 114. The middle scissor layer 102 includes inner arms 120 and outer arms 122 that pivot relative to one another about a lateral axis, shown as middle axis 124. The middle scissor layer 104 includes inner arms 130 and outer arms 132 that pivot relative to one another about a lateral axis, shown as middle axis 134. The top scissor layer 106 includes inner arms 140 and outer arms 142 that pivot relative to one another about a lateral axis, shown as middle axis 144.

The scissor layers are stacked atop one another to form the lift assembly 14. Each pair of inner arms and each pair of outer arms has a top end and a bottom end. The ends of the inner arms and the outer arms are pivotally coupled (e.g., by one or more pins or rods) to the adjacent ends of the inner or outer arms of the adjacent scissor layers. Each set of inner arms is directly pivotally coupled to one or more sets of outer arms. This facilitates spacing each pair of inner arms a first distance apart from one another and spacing each pair of outer arms a second distance apart from one another, where the second distance is greater than the first distance. This facilitates ensuring that the fully lowered position is as low as possible, increasing the accessibility of the platform 16 and making the lift device 10 more compact.

The upper ends of the outer arms 112 are pivotally coupled to the lower ends of the inner arms 120 such that they rotate relative to one another about a lateral axis, shown as end axis 150. The upper ends of the inner arms 110 are pivotally coupled to the lower ends of the outer arms 122 such that they rotate relative to one another about another end axis 150. The upper ends of the outer arms 122 are pivotally coupled to the lower ends of the inner arms 130 such that they rotate relative to one another about a lateral axis, shown as end axis 152. The upper ends of the inner arms 120 are pivotally coupled to the lower ends of the outer arms 132 such that they rotate relative to one another about another end axis 152. The upper ends of the outer arms 132 are pivotally coupled to the lower ends of the inner arms 140 such that they rotate relative to one another about a lateral axis, shown as end axis 154. The upper ends of the inner arms 130 are pivotally coupled to the lower ends of the outer arms 142 such that they rotate relative to one another about another end axis 154.

Figure 5:
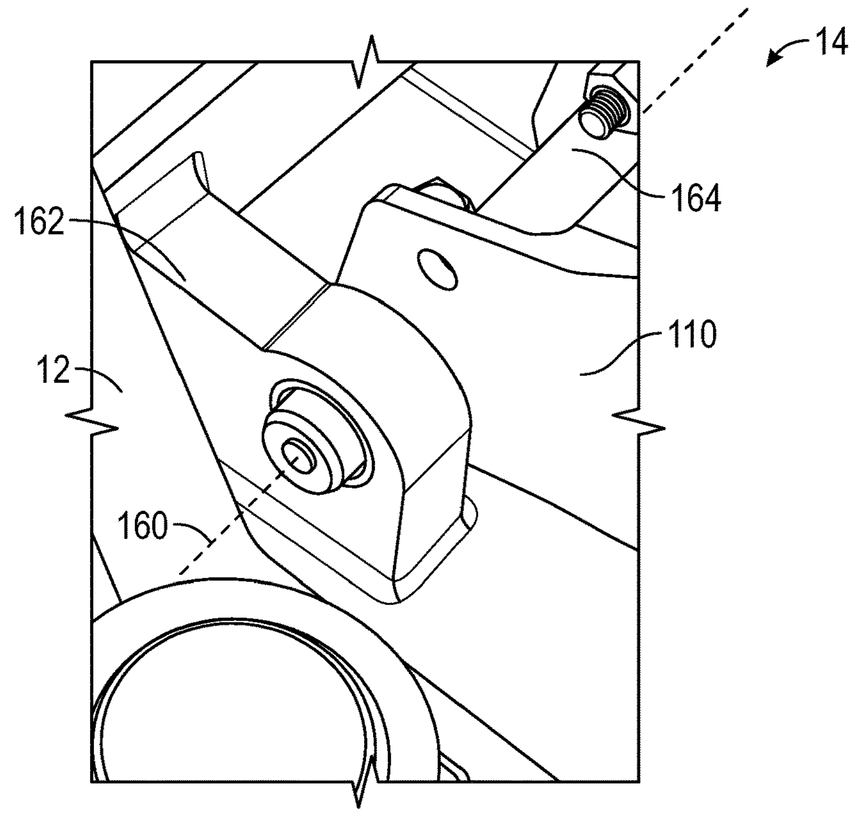
FIG. 5 is a perspective view of a frame and a lift assembly of the lift device of FIG. 1.

Referring to FIG. 5, the lower ends of the inner arms 110 are pivotally coupled to the frame assembly 12 such that the inner arms 110 rotate relative to the frame assembly 12 about a lateral axis, shown as end axis 160. The end axis 160 is fixed to the frame assembly 12 such that the lower ends of the inner arms 110 are translationally fixed relative to the frame assembly 12. A pair of bosses, shown as bearing blocks 162, are coupled (e.g., welded, fastened, etc.) to the frame assembly 12. The bearing blocks 162 are each configured to receive a rod or pin, shown as pin 164. The bearing blocks 162 and the pins 164 may be configured to facilitate rotation of the pins 164 about the end axis 160. The pins 164 each extend along the end axis 160 through one of the bearing blocks 162 and the corresponding inner arms 110. The pins 164 and the bearing blocks 162 pivotally couple the inner arms 110 to the frame assembly 12.

Figure 6:
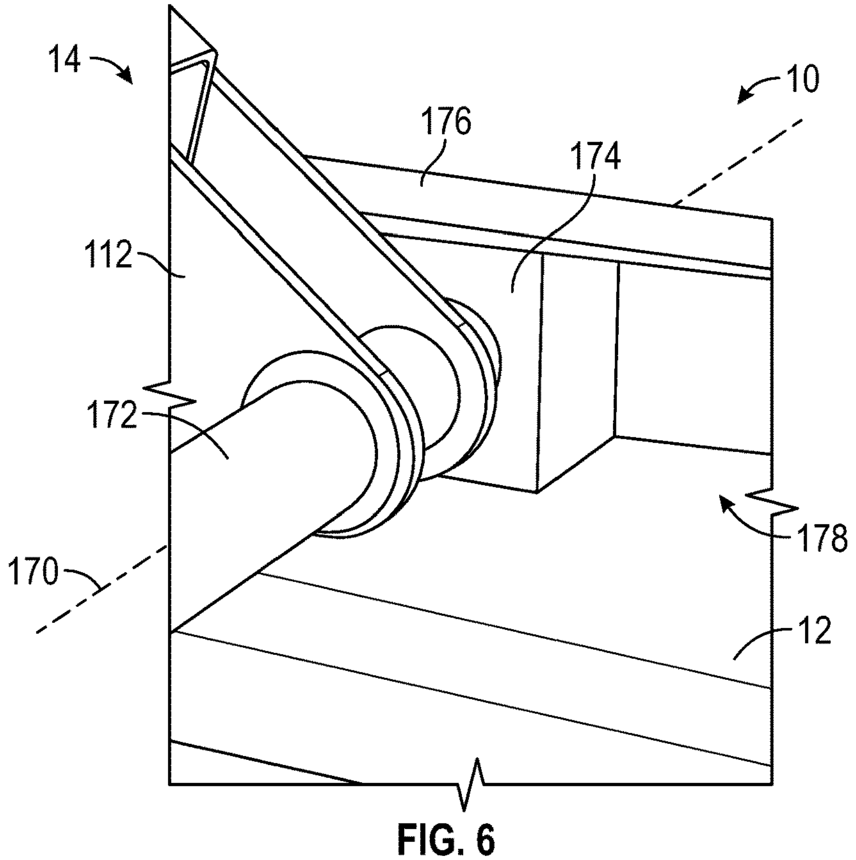
FIG. 6 is another perspective view of the frame and the lift assembly of FIG. 5.

Referring to FIG. 6, the lower ends of the outer arms 112 are pivotally and slidably coupled to the frame assembly 12 such that the outer arms 112 rotate relative to the frame assembly 12 about a lateral axis, shown as end axis 170. The end axis 170 is translatable longitudinally relative to the frame assembly 12 such that the lower ends of the outer arms 112 are slidable longitudinally relative to the frame assembly 12. A tubular member, shown as rod 172, extends laterally between both of the outer arms 112. The rod 172 is coupled (e.g., welded, fastened, etc.) to the outer arms 112. The rod 172 further extends laterally outside of the outer arms 112. Each end of the rod 172 is received within an aperture defined by a block, shown as sliding block 174. The sliding blocks 174 are accordingly pivotally coupled to the rod 172. A pair of frame members, shown as channels 176 are coupled to (e.g., fastened to, welded to, integrally formed with, etc.) the frame assembly 12. The channels 176 extend longitudinally along the frame assembly 12. The channels 176 each define a recess 178 that receives the sliding block 174. Each of the recesses 178 face toward a longitudinal centerline of the lift device 10 such that the sliding blocks 174 are captured laterally by the channels 176. The sliding blocks 174 are free to translate longitudinally along the channels 176 to permit pivoting of the outer arms 112 relative to the inner arms 110.

Figure 3:
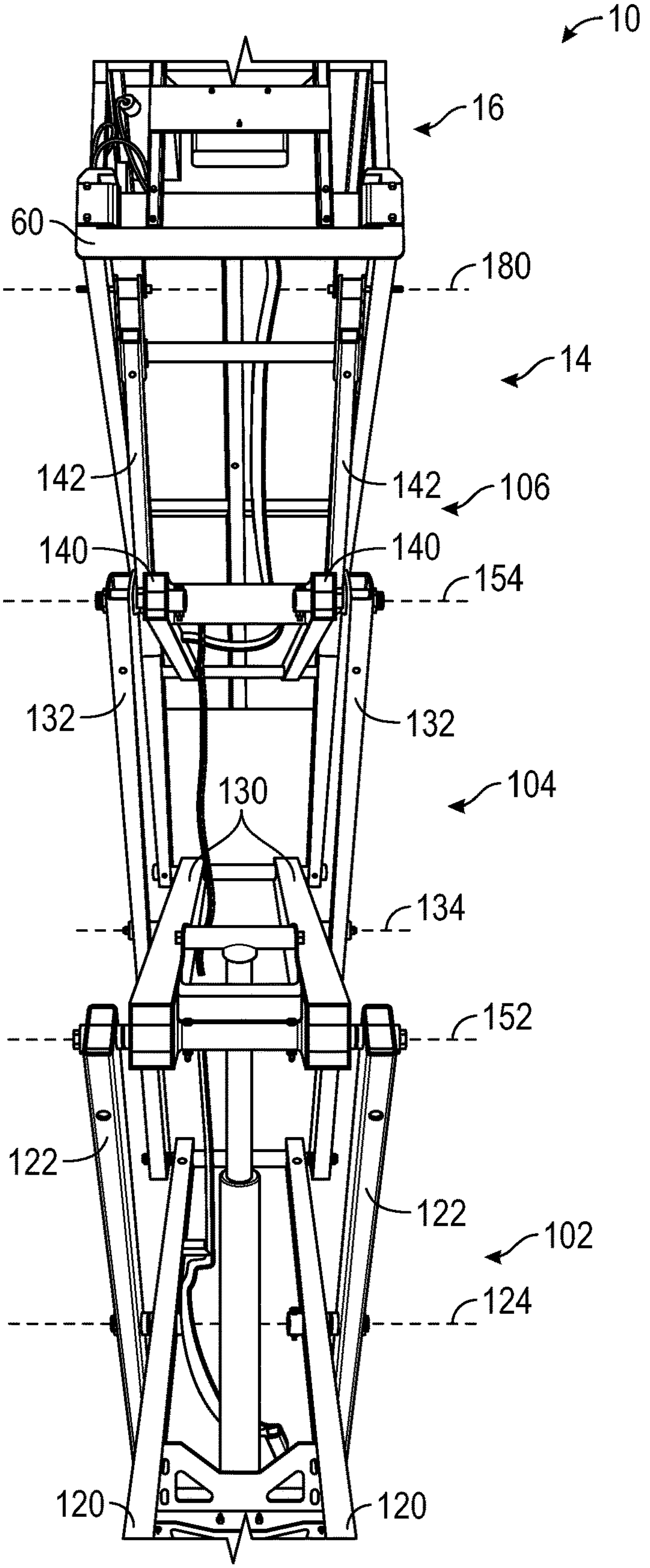
FIG. 3 is a left side view of the lift device of FIG. 1.
Figure 4:
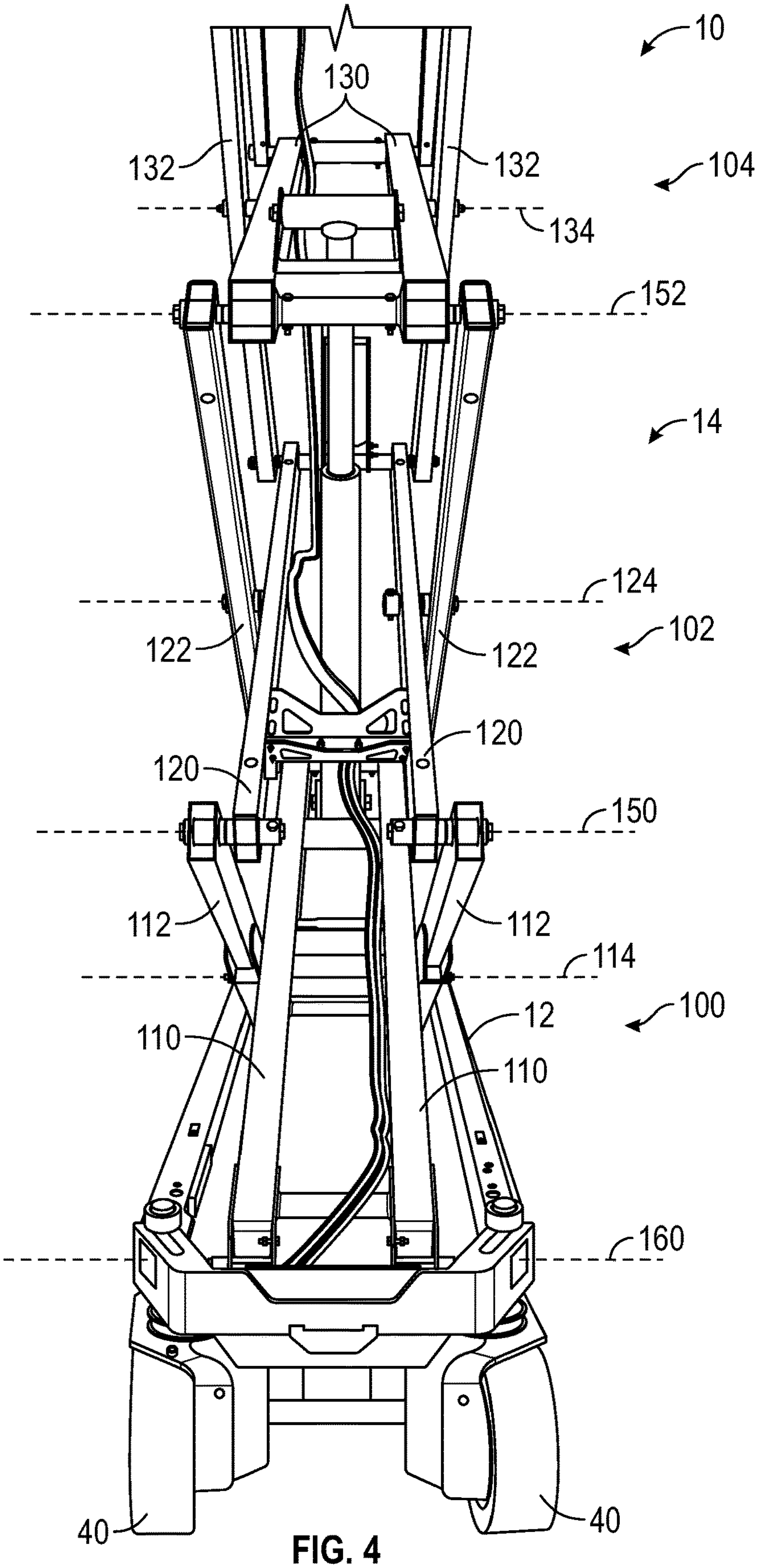
FIG. 4 is another left side view of the lift device of FIG. 1.

Referring to FIG. 3, the upper ends of the outer arms 142 are pivotally coupled to the deck 60 of the platform 16 such that the outer arms 142 rotate relative to the deck 60 about a lateral axis, shown as end axis 180. The end axis 180 is fixed to the platform 16 such that the upper ends of the outer arms 142 are translationally fixed relative to the platform 16. In one embodiment, a pair of pins couple the outer arms 142 to the platform 16. The pins may each extend along the end axis 180 through one of the outer arms 142 and a portion of the deck 60.

Figure 7:
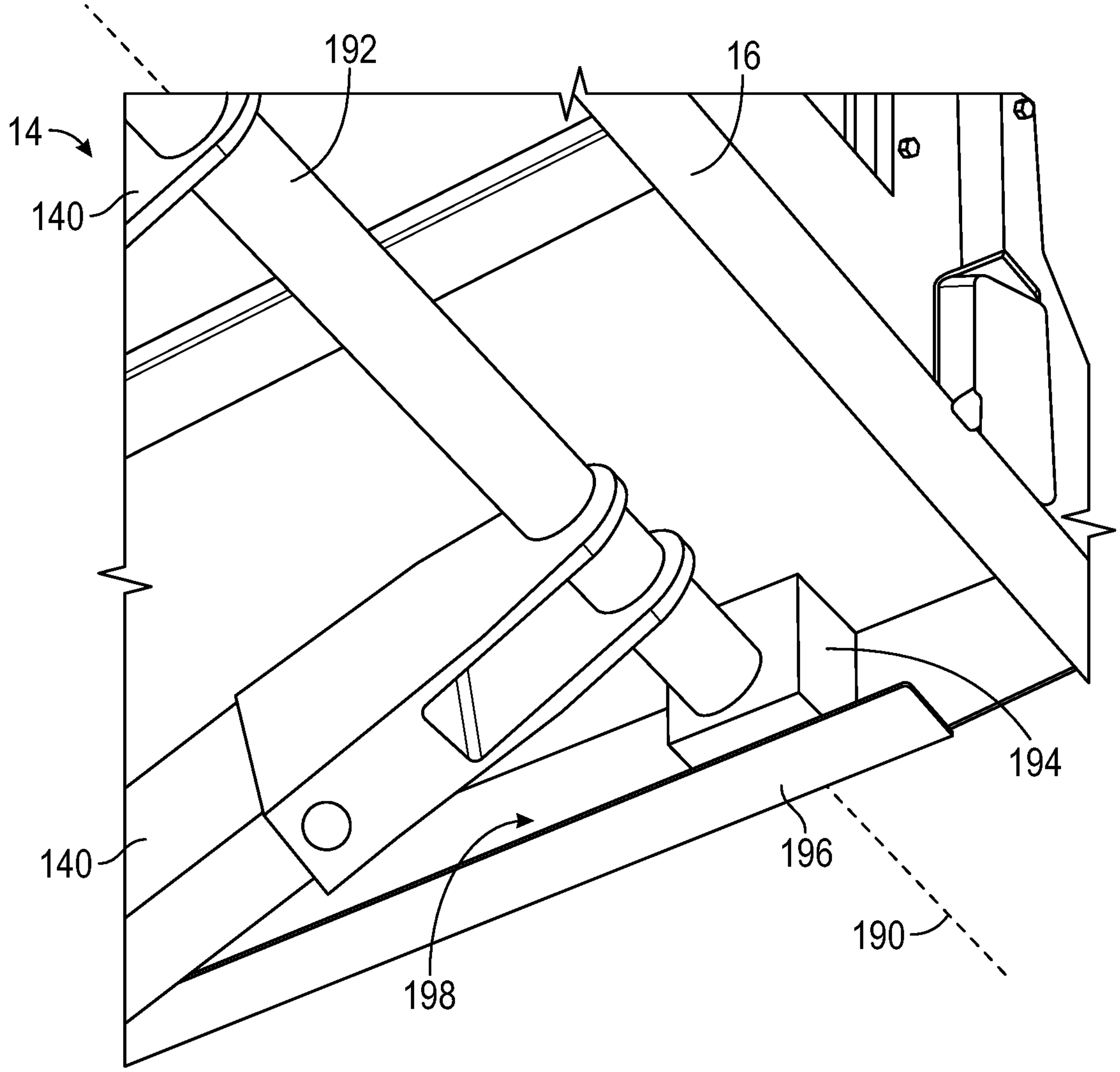
FIG. 7 is a perspective view of a platform of the lift device of FIG. 1 and the lift assembly of FIG. 5.

Referring to FIG. 7, the upper ends of the inner arms 140 are pivotally and slidably coupled to the deck 60 of the platform 16 such that the inner arms 140 rotate relative to the deck 60 about a lateral axis, shown as end axis 190. The end axis 190 is translatable longitudinally relative to the platform 16 such that the upper ends of the inner arms 140 are slidable longitudinally relative to the platform 16. A tubular member, shown as rod 192, extends laterally between both of the inner arms 140. The rod 192 is coupled (e.g., welded, fastened, etc.) to the inner arms 140. The rod 192 further extends laterally outside of the inner arms 140. Each end of the rod 192 is received within an aperture defined by a block, shown as sliding block 194. The sliding blocks 194 are accordingly pivotally coupled to the rod 192. A pair of frame members, shown as channels 196 are coupled (e.g., fastened, welded, integrally formed with, etc.) to the frame assembly 12. The channels 196 extend longitudinally along the platform 16. The channels 196 each define a recess 198 that receives the sliding block 194. Each of the recesses 198 face toward a longitudinal centerline of the lift device 10 such that the sliding blocks 194 are captured laterally by the channels 196. The sliding blocks 194 are free to translate longitudinally along the channels 196 to permit pivoting of the inner arms 140 relative to the outer arms 142.

Referring to FIG. 2, a plane, shown as vertical center plane 199, is defined relative to the lift assembly 14. The vertical center plane 199 is centered longitudinally along the lift assembly such that the vertical center plane 199 extends through the centers of (e.g., contains) the middle axis 114, the middle axis 124, the middle axis 134, and the middle axis 144. The vertical center plane 199 extends perpendicular to the longitudinal axis 32. The vertical center plane 199 moves with the middle axes when the lift assembly 14 extends or retracts. The end axes (e.g., the end axis 160, the end axis 170, the end axis 180, the end axis 190, the end axes 150, the end axes 152, the end axes 154, etc.) are all longitudinally offset (e.g., forward, rearward, etc.) from the vertical center plane 199.

Figure 9:
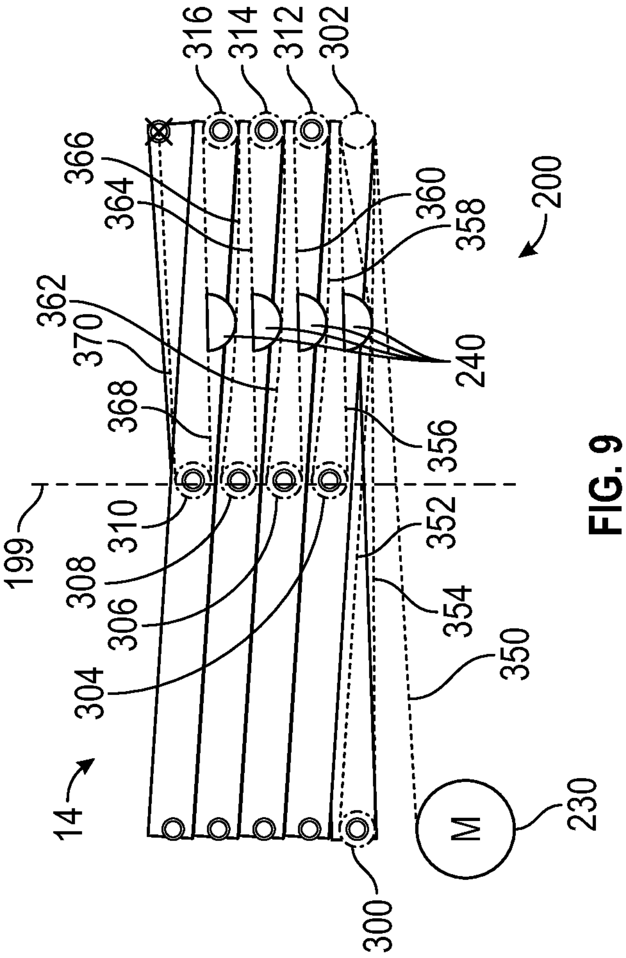
FIG. 9 is side view of the lift assembly and the actuator assembly of FIG. 8 in a fully retracted position.
Figure 8:
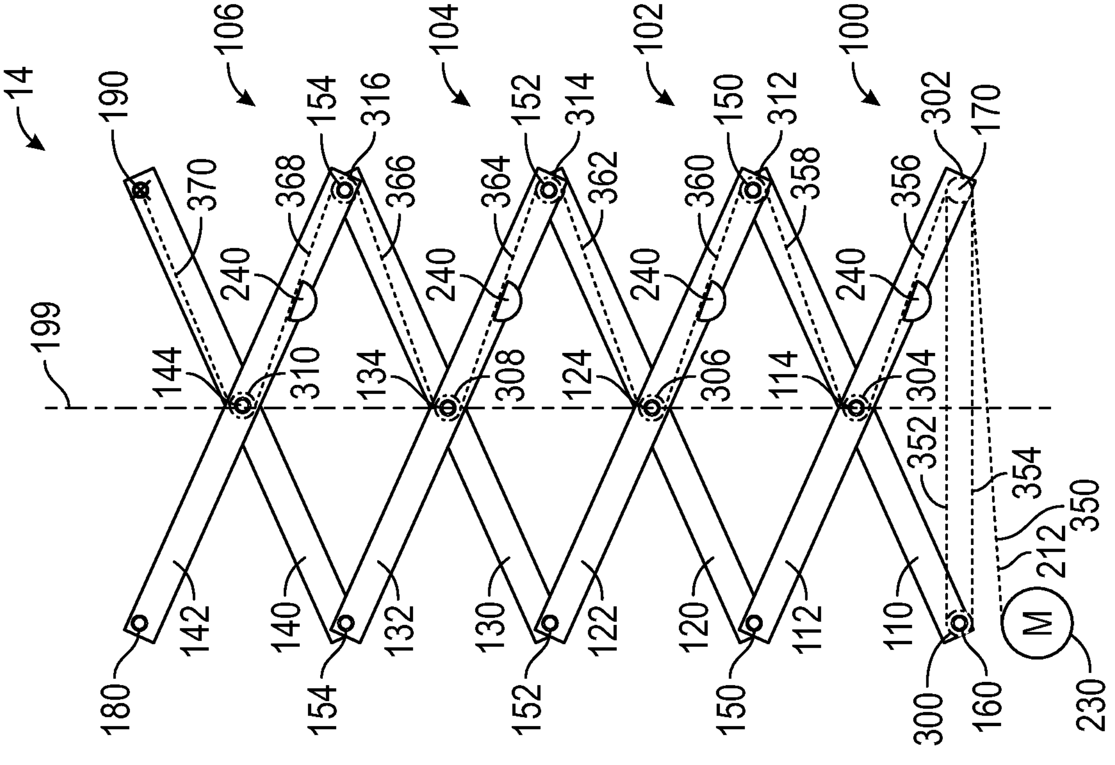
FIG. 8 is a side view of a lift assembly and an actuator assembly for a lift device in a partially extended position, according to an exemplary embodiment.

Referring to FIGS. 8 and 9, the lift assembly 14 includes a cable and pulley system, shown as actuator assembly 200. The actuator assembly 200 is configured to extend the lift assembly 14 from the fully retracted position to the fully extended position, thereby moving the platform 16 from the fully lowered position to the fully raised position. The lift assembly 14 is biased toward the fully retracted position by the force of gravity acting on the lift assembly 14 and the platform 16. In some embodiments, the actuator assembly 200 is only configured to extend the lift assembly 14. In such embodiments, the platform 16 may be lowered by releasing the actuator assembly 200 and permitting gravity to lower the platform 16. In other embodiments, the actuator assembly 200 actively imparts a force on the lift assembly 14 to retract the lift assembly 14.

To facilitate discerning between the pulleys, the cable, and the scissor arms in FIGS. 8, 9, and 11-16, the cable is shown as dashed lines having dashes of equal lengths, and the pulleys are shown as dash-dot lines. These line types do not necessarily designate the locations of the cables and pulleys in the foreground or background of each figure (e.g., if the pulleys and cables are in front of or behind the scissor arms). Rather, the cables and pulleys may be in any lateral location within the lift assembly 14 except as otherwise specified.

The actuator assembly 200 includes a system of bushings, bearings, rollers, or pulleys (e.g., the pulley 300, the pulley 302, etc.), around which a tensile member (e.g., a rope, a cable, a chain, a strap, a belt, etc.), shown as cable 212, extends. The pulleys are coupled to the lift assembly 14. The pulleys may be rotatably coupled to the lift assembly 14 such that the pulleys rotate when the cable 212 travels relative to the pulleys. Alternatively, the pulleys may be stationary relative to part of the lift assembly 14 (e.g., fixedly coupled to the lift assembly 14, rotatably coupled to the lift assembly 14 with a high-friction connection, etc.). In such embodiments, the surfaces of the pulleys that engage the cable 212 may be configured to minimize friction (e.g., maximize slippage) between the pulleys and the cable 212. Although the pulleys are shown positioned laterally outward from the outer scissor arms, the pulleys may be in any lateral position relative to the lift assembly 14 (e.g., outside of the outer scissor arms, between the inner scissor arms and the outer scissor arms, between the inner scissor arms, etc.).

The pulleys are configured to redirect the cable 212 at various locations throughout the lift assembly 14. When a tensile force is exerted on the cable 212, the cable 212 imparts forces on the pulleys in the direction of the cable 212. By way of example, if the cable 212 were to come into a pulley in a purely longitudinal direction and be redirected to leave the pulley in a purely vertical direction, the cable 212 would exert a longitudinal force and a vertical force onto the pulley. The pulleys then transfer these forces into the components of the lift assembly to which they are coupled (e.g., the scissor arms). The pulleys primarily redirect the cable 212 about lateral axes extending through the centers of the pulleys. Additionally or alternatively, the pulleys may redirect the cable 212 about one or more vertical axes. By way of example, the actuator assembly 200 may include multiple pulleys all rotating about the same lateral axis. A pulley may be configured to redirect the cable 212 about a vertical axis to pass the cable 212 between two such pulleys.

Figure 10:
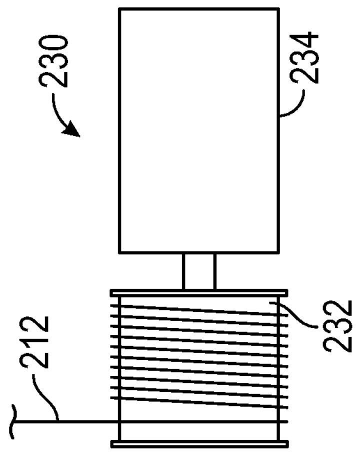
FIG. 10 is a top view of an actuator assembly of a lift device, according to an exemplary embodiment.

Referring to FIG. 10, to control the motion of the lift assembly 14, the actuator assembly 200 includes a slack or tension control device, shown as drum assembly 230 (e.g., an actuator, an electric actuator, etc.). The drum assembly 230 is configured to control a working length of the cable 212 and impart a tensile force on the cable 212 to control extension and retraction of the lift assembly 14. The drum assembly 230 includes a drum, spool, spindle, or capstan, shown as drum 232. A stored length of the cable 212 is wound around the drum 232. Together, the stored length and the working length make up the entirety of the cable 212. Rotation of the drum 232 in a first direction tensions the cable to remove a portion of the cable 212 from the working length and transfer that portion of the cable 212 to the stored length. Rotation of the drum 232 in a second direction opposite the first direction removes a portion of the cable 212 from the stored length and transfers that portion of the cable 212 to the working length.

The drum assembly 230 includes a driver, shown as electric motor 234. The electric motor 234 is configured to impart a torque onto the drum 232, causing the drum to rotate in the first direction or the second direction. When the torque is imparted in the first direction, the drum 232 introduces a tensile force into the cable 212. This tensile force may be substantially constant throughout the cable 212. This tensile force causes the cable 212 to force one or more of the pulleys toward the vertical center plane 199, extending the lift assembly 14. By utilizing an electric motor 234 to drive the lift assembly 14, the lift device 10 can be configured to operate using only electrical energy (e.g., as a pure electric or full electric device, without the use of an internal combustion engine, without the use of hydraulic components, etc.). Traditionally, lift devices utilize one or more hydraulic cylinders directly coupled to a lift assembly to actuate the lift assembly. The hydraulic cylinders require various control components (e.g., pumps, valves, etc.) to provide and control flows of hydraulic fluid to control their extension and retraction. The use of an electric motor to actuate the lift assembly 14 eliminates the need for such components, reducing the cost and complexity of the lift device 10 and eliminating the potential for leaks of hydraulic fluid. Additionally, the use of pulleys facilitates imparting an extension force at multiple locations along the lift assembly 14, reducing stresses within the lift assembly 14. In other embodiments, the electric motor 234 is another type of driver, such as a hydraulic motor, a pneumatic motor, or a power take off shaft coupled to an engine.

In other embodiments, the drum assembly 230 is replaced with a different type of slack control device. By way of example, the slack control device may include a linear actuator with one or more pulleys on each end. The pulleys may receive the cable 212 such that the cable 212 extends between the pulleys. As the linear actuator extends or retracts, the distance between the pulleys varies, drawing in or releasing the cable 212 from the stored length.

In some embodiments, the actuator assembly 200 further includes one or more actuators or biasing members, shown as kickers 240 (e.g., boosters, impellers, deployment devices, excitement devices, etc.). As the lift assembly 14 extends and retracts, the positions of the pulleys relative to the middle axes (e.g., the middle axis 114, the middle axis 124, etc.) vary. Accordingly, mechanical advantage of the cable 212 acting to extend the lift assembly 14 varies. This variation in mechanical advantage means that the tensile force within the cable 212 that is required to lift a given load on the platform 16 varies as the lift assembly 14 is extended or retracted. The mechanical advantage is smallest when the lift assembly 14 is in the fully retracted position. As such, the maximum required tensile force on the cable 212 is experienced when moving the lift assembly 14 out of the fully retracted position. The kickers 240 are configured to provide a supplemental force to move the lift assembly 14 toward the fully extended position when the lift assembly is near the fully retracted position, lessening the maximum tensile force required within the cable 212.

The kickers 240 may be actively controlled or passively controlled. By way of example, the kicker 240 may be an actively controlled actuator, such as a hydraulic cylinder, a pneumatic cylinder, or an electric motor. Such an actuator may be manually activated or may be automatically activated (e.g., by a controller, by a valve, etc.) when the platform 16 is raised from the fully lowered position. By way of another example, the kicker 240 may be a passively controlled biasing member, such as a spring (e.g., a coil spring, a gas spring, a rubber bumper, etc.). Such a biasing member may be configured to constantly impart an upward biasing force on the platform 16 and/or the lift assembly 14 when the platform 16 is within a threshold distance of the fully lowered position. Such a biasing force may be constant or may decrease (e.g., linearly) as the platform 16 is raised. In some embodiments, the kickers 240 impart a negligible (e.g., zero) force when the platform 16 is in a position above the fully lowered position. By way of example, as shown in FIGS. 8 and 9, as the platform 16 is raised, the kickers 240 come out of contact with the cable 212 such that the kickers 240 provide no upward force (e.g., starting at a position between the fully lowered position and the fully raised position).

Figure 12:
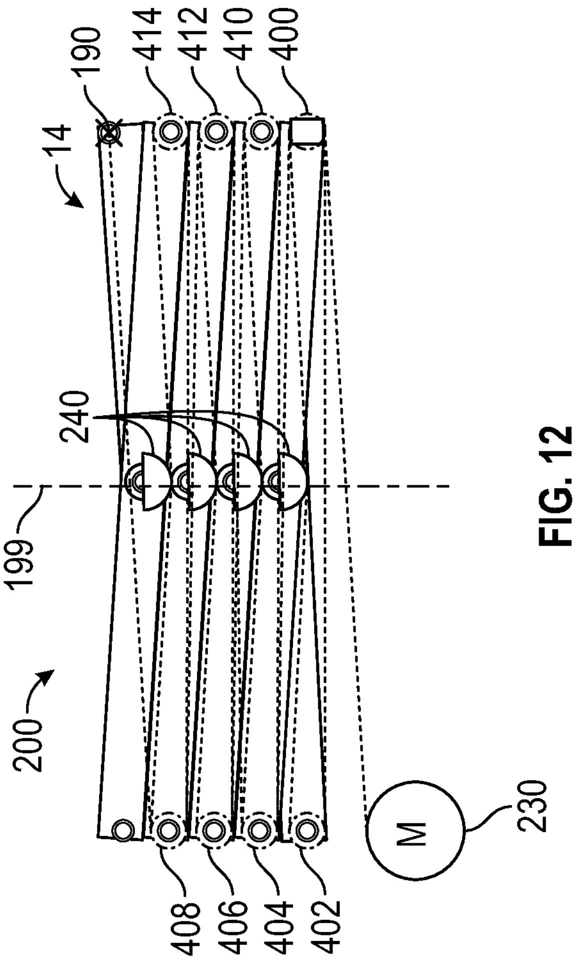
FIG. 12 is side view of the lift assembly and the actuator assembly of FIG. 11 in a fully retracted position.
Figure 11:
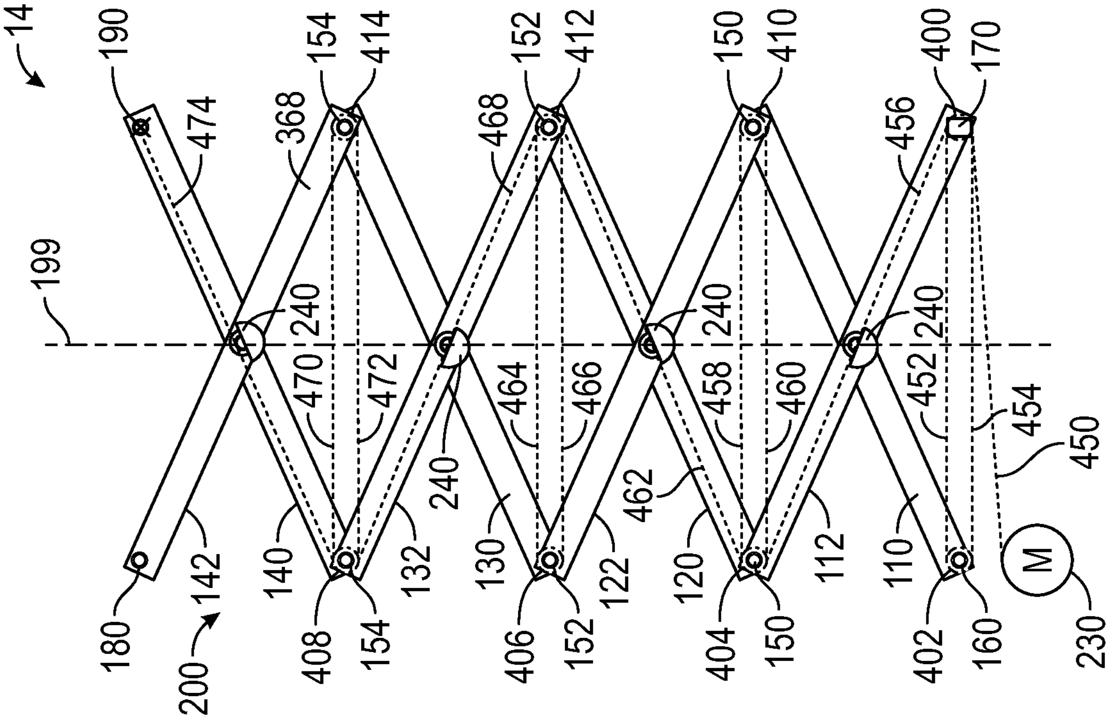
FIG. 11 is a side view of a lift assembly and an actuator assembly for a lift device in a partially extended position, according to another exemplary embodiment.
Figure 14:
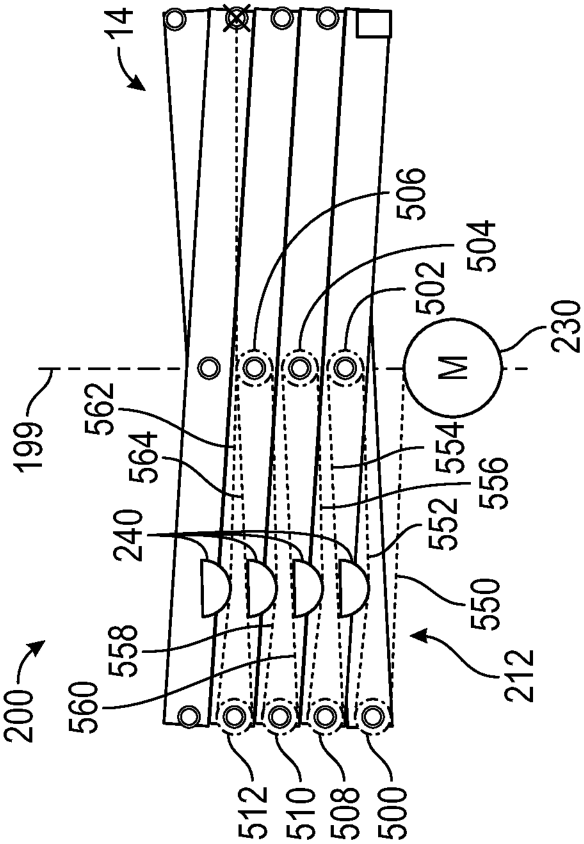
FIG. 14 is side view of the lift assembly and the actuator assembly of FIG. 13 in a fully retracted position.
Figure 13:
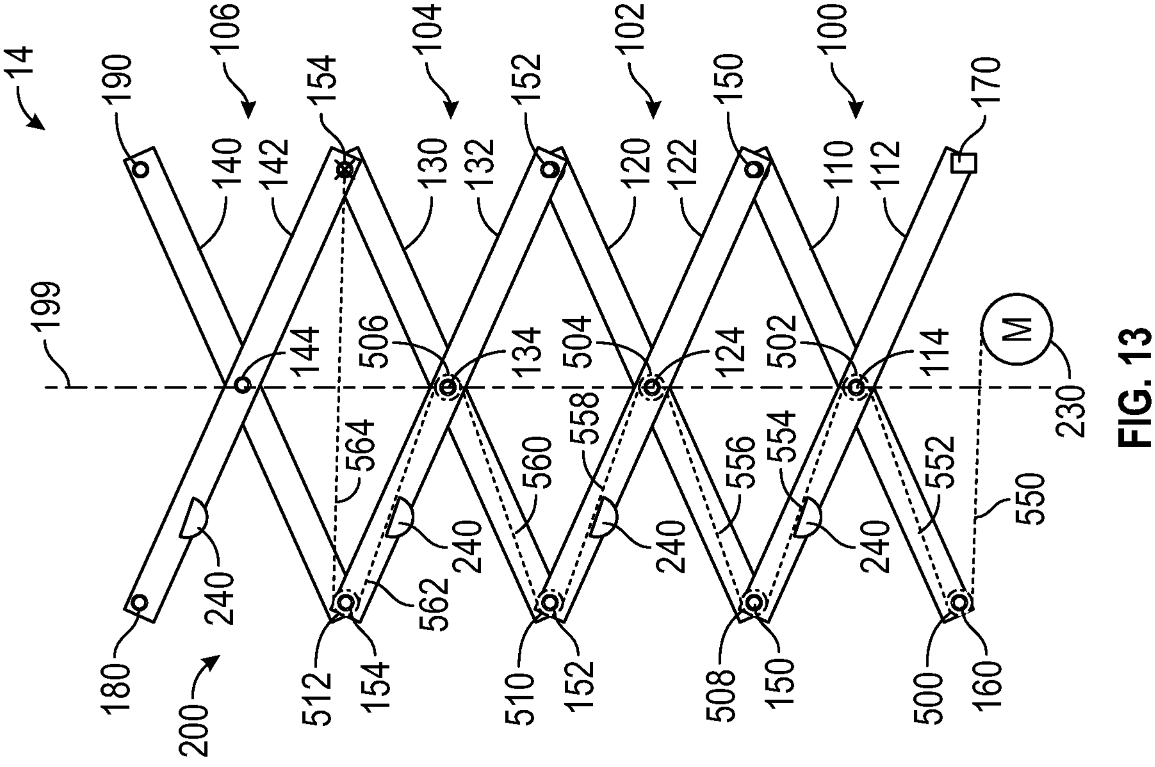
FIG. 13 is a side view of a lift assembly and an actuator assembly for a lift device in a partially extended position, according to another exemplary embodiment.
Figure 16:
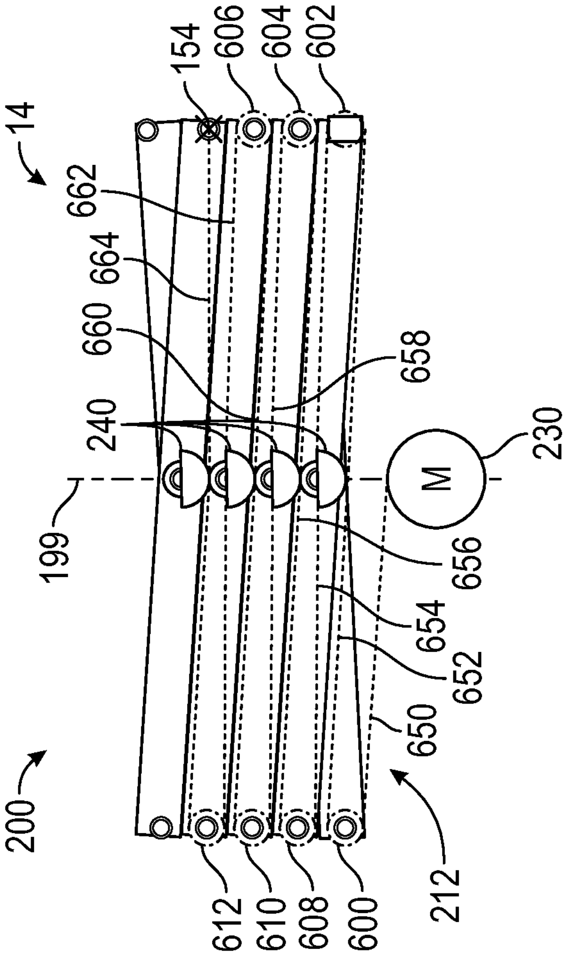
FIG. 16 is side view of the lift assembly and the actuator assembly of FIG. 15 in a fully retracted position.
Figure 15:
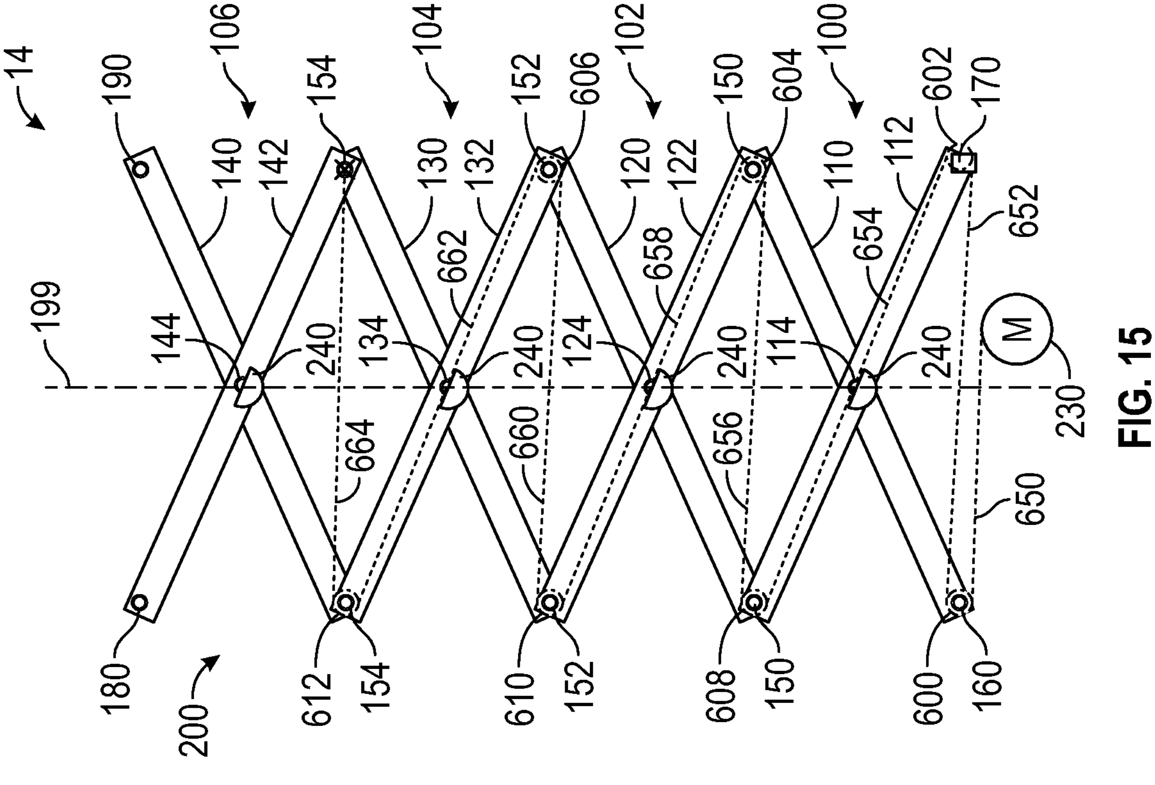
FIG. 15 is a side view of a lift assembly and an actuator assembly for a lift device in a partially extended position, according to another exemplary embodiment.

The kickers 240 may be configured to impart a vertical biasing force (e.g., a partially vertical force, a purely vertical force, an upward force, a lift force, etc.) on the frame assembly 12, the lift assembly 14, the platform 16, and tor the cable 212. The kickers 240 may engage the scissor arms, the cable 212, the frame assembly 12, the deck 60, or other components of the lift device 10. As shown in FIGS. 8 and 9, a kicker 240 is coupled to each of the outer arms approximately centered between the middle and end axes and configured to engage the cable 212 beneath it to impart a vertical biasing force that forces the end axis 180 apart from the end axis 154. As shown in FIGS. 11 and 12, a kicker 240 is coupled to a pin extending along the middle axis 144 and configured to engage the cable 212 (e.g., the horizontal strand 472) to impart a vertical biasing force that forces the middle axis 144 apart from the middle axis 134. As shown in FIGS. 13 and 14, a kicker 240 is coupled to the outer arm 142 and configured to engage the cable 212 (e.g., the fixed strand 564) to impart a vertical force that forces the outer arm 142 and the outer arm 132 apart from one another. As shown in FIGS. 15 and 16, a kicker 240 is coupled to a pin extending along the middle axis 144 and configured to engage the cable 212 (e.g., the fixed strand 664) to impart a vertical biasing force that forces the middle axis 144 apart from the middle axis 134.

In some embodiments, the kickers 240 each engage a portion of the cable 212 positioned directly below kicker 240 when the platform 16 is in the fully lowered position.

This may impart a vertical force on the cable 212 such that the cable 212 is deflected downward at the kicker 240. Accordingly, the cable 212 may impart an upward normal force on the kicker 240 that the kicker 240 transfers to the corresponding scissor arm(s). In some embodiments, the deflection of the cable 212 reorients the cable 212 such that the mechanical advantage of the cable 212 increases, further reducing the tension of the cable 212 required to extend the lift assembly 14.

Additionally or alternatively, the kickers 240 may be configured to impart a biasing force about an axis of rotation (e.g., a biasing torque). By way of example, the kicker 240 may include a torsion spring that is positioned around an end axis or a middle axis. The biasing torque may be configured to bias the relative orientation of two scissor arms toward an orientation that corresponds to the fully extended position of the lift assembly 14. By way of example, an angle that is bisected by the vertical center plane 199 (e.g., the top angle between the inner arm 120 and the outer arm 122) decreases as the lift assembly 14 extends. The kicker 240 may be configured to apply a biasing torque on the inner arm 120 and the outer arm 122 about the middle axis 124 to bias the inner arm 120 and the outer arm 122 toward decreasing the top angle.

The quantity of the kickers 240 may be varied throughout different embodiments. FIGS. 8, 11, 13, and 15 each show the actuator assembly 200 as including four of the kickers 240. In other embodiments, one or more of these kickers 240 are omitted. In yet other embodiments, additional kickers 240 are added. By way of example, the actuator assembly 200 may include three of the kickers 240 acting on the bottom scissor layer 100, two of the kickers 240 acting on the middle scissor layer 104, and one of the kickers 240 acting on each of the middle scissor layer 104 and the top scissor layer 106. The actuator assembly 200 may include both kickers 240 that impart vertical biasing forces and kickers 240 that impart biasing torques.

Referring to FIGS. 8 and 9, the actuator assembly 200 is shown according to a first embodiment. FIG. 8 shows the lift assembly 14 in a partially extended position, and FIG. 9 shows the lift assembly 14 in a fully retracted configuration. In this embodiment, a pulley 300 is rotatably coupled to the lift assembly 14 such that it rotates about the end axis 160. A pulley 302 is rotatably coupled to the lift assembly 14 such that it rotates about the end axis 170. Pulleys 304, 306, 308, and 310 are rotatably coupled to the lift assembly 14 such that they rotate about each of the middle axis 114, the middle axis 124, the middle axis 134, and the middle axis 144, respectively. Pulleys 312, 314, and 316 are rotatably coupled to the lift assembly 14 such that they rotate about each of the end axis 150, the end axis 152, and the end axis 154 on the same side of the lift assembly 14 as the end axis 170. Each of these pulleys are centered about their respective end or middle axes.

The cable 212 extends from the drum assembly 230 and around each of the pulleys, and an end of the cable 212 is fixed to the inner arms 140 at the end axis 190. The pulleys divide the cable 212 into a series of sections or portions, shown as strands. Each strand may substantially straight when under tension. A first strand, shown as motor strand 350, extends from the drum assembly 230 to the pulley 302. The cable 212 extends around the pulley 302 and forms a second strand, shown as horizontal strand 352, extending between the pulley 302 and the pulley 300. A third strand, shown as horizontal strand 354 extends back from the pulley 300 to the pulley 302. The horizontal strand 352 and the horizontal strand 354 each extend substantially horizontally. The horizontal strand 352 is positioned above the horizontal strand 354. The horizontal strand 352 and the horizontal strand 354 cooperate to form a loop. To accommodate the cable 212 passing over the pulley 302 twice, the pulley 302 may have an increased width and/or the pulley 302 may include multiple individual pulleys that all rotate about the same axis.

A fourth strand, shown as angled strand 356, extends from the pulley 302 to the pulley 304. A fifth strand, shown as angled strand 358, extends from the pulley 304 to the pulley 312. A sixth strand, shown as angled strand 360, extends from the pulley 312 to the pulley 306. A seventh strand, shown as angled strand 362, extends from the pulley 306 to the pulley 314. An eighth strand, shown as angled strand 364, extends from the pulley 314 to the pulley 308. A ninth strand, shown as angled strand 366, extends from the pulley 308 to the pulley 316. A tenth strand, shown as angled strand 368, extends from the pulley 316 to the pulley 310. An eleventh strand, shown as fixed strand 370, extends from the pulley 310 to the inner arms 140. The fixed strand 370 is fixed (e.g., fixedly coupled) to one or both of the inner arms 140 along the end axis 190. In other embodiments, the fixed strand 370 is fixed elsewhere along the inner arms 140.

When the cable 212 is tensioned by the drum assembly 230, the cable 212 imparts forces on the pulleys in the direction of the cable 212. Accordingly, the directions of the forces on the pulleys can be visualized by observing the orientations of the strands of the cables 212. Referring to FIG. 8, when the lift assembly 14 is partially extended, the fixed strand 370 imparts a downward and longitudinally inward (i.e., oriented toward the vertical center plane 199 of the lift assembly 14) force on the inner arms 140 at the end axis 190.

The fixed strand 370 imparts an upward and longitudinally outward force on the pulley 310. The angled strand 368 imparts a downward and longitudinally outward force on the pulley 310. The upward and downward components of the forces on the pulley 310 partially or completely cancel one another such that the net force on the pulley 310 is a substantially longitudinally outward force. The angled strands 356, 358, 360, 362, 364, and 366 impart similar forces on the pulley 304, the pulley 306, and the pulley 308.

The angled strand 368 imparts an upward and longitudinally inward force on the pulley 316. The angled strand 366 imparts a downward and longitudinally inward force on the pulley 316. The upward and downward components of the forces on the pulley 310 partially or completely cancel one another such that the net force on the pulley 316 is a substantially longitudinally inward force. The angled strands 358, 360, 362, and 364 impart similar forces on the pulley 312 and the pulley 314.

The angled strand 356 imparts an upward and longitudinally inward force on the pulley 302. The horizontal strand 352 and the horizontal strand 354 each impart longitudinally inward forces on the pulley 300 and the pulley 302. Depending upon the position on the drum assembly 230, the motor strand 350 may impart a longitudinally inward and/or downward force on the pulley 302.

The net forces of the cable 212 on the end axis 190 and on the pulleys that are longitudinally offset from the vertical center plane 199 (e.g., the pulley 300, the pulley 302, the pulley 312, the pulley 314, and the pulley 316) are directed at least partially longitudinally inward. Accordingly, the tension on the cable 212 drives these pulleys and the end axis 190 toward the vertical center plane 199. This forces the lift assembly 14 to extend, raising the platform 16. A portion of the forces of the strands may be directed into the scissor arms. By way of example, the angled strand 356 extends along the outer arms 112 between the pulley 302 and the pulley 304, which are aligned with the end axis 170 and the middle axis 114, respectively. A portion of the force within the angled strand 356 acts as a compressive force onto the outer arms 112 between the pulley 302 and the pulley 304. However, the radii of the pulley 302 and the pulley 304 offset the angled strand 356 from the end axis 170 and the middle axis 114 such that a portion of the force acts to move the pulley 302 closer to the pulley 304, extending the lift assembly 14. The inclusion of strands that extend between the two scissor arms of a scissor section (e.g., the horizontal strand 352 and the horizontal strand 354 that extend between the end axis 160 and the end axis 170) may be desirable, as this positioning may maximize the mechanical advantage of the cable 212 to rotate the scissor arms.

Because the tension is substantially uniform throughout the cable 212, each of the strands imparts a substantially equal force. Each pair of adjacent pulleys above the pulley 302 and the pulley 304 has only one strand pulling them directly toward one another. By way of example, only the angled strand 366 extends directly between the pulley 308 and the pulley 316, pulling them toward one another. However, the horizontal strand 352 and the horizontal strand 354 form a full loop around the pulley 302 and the pulley 304 such that two strands pull the pulley 302 and the pulley 304 directly toward one another. This doubles the force pulling the pulley 302 and the pulley 304 directly toward one another relative to a configuration where only one strand acts to pull them directly toward one another. Additional loops may be added (e.g., the cable 212 may wrap around the pulley 302 and the pulley 304 multiple times) to further increase the force. By way of example, a configuration with four loops (i.e., corresponding to eight strands) would have eight times the force as an embodiment with only a single strand. Additional loops may be added between any two adjacent pulleys (e.g., between the pulley 316 and the pulley 310, etc.). Each loop may have an enclosed (e.g., circular, elliptical, polygonal, etc.) shape (e.g., as shown in FIG. 8) such that the associated strands extend parallel to one another or a crossed (e.g., overlapping, figure eight, etc.) shape such that the associated strands cross one another between the pulleys.

Looping the cable 212 around the pulleys increases the length of the cable 212 that must be retracted by the drum assembly 230 to move the lift assembly 14 throughout its range of motion. However, increasing the number of loops increases the lifting force of the lift assembly 14 without increasing the tension of the cable 212 or the torque of the electric motor 234. In some embodiments, it is desirable to increase the number of loops that act directly on the lower scissor layers, as the force required to lift the lift assembly 14 increases through each consecutive lower scissor layer. By way of example, whereas a force pulling the end axis 154 longitudinally inward would have to lift only the weight of the platform 16 and the top scissor layer 106, a force pulling the end axis 170 longitudinally inward would have to lift the weight of the platform 16 and all of the scissor layers.

As shown in FIG. 9, near the fully retracted position, the orientations of some of the strands change. By way of example, the angled strand 368 pulls downward on the pulley 316 instead of upward. In general, the forces of the cable 212 still drive the pulleys 300, 302, 312, 314, and 316 toward the vertical center plane 199, even when near the fully retracted configuration. Additionally, the kickers 240 are configured to assist extending the lift assembly near the fully retracted configuration.

Referring to FIGS. 11 and 12, the actuator assembly 200 is shown according to a second embodiment. FIG. 11 shows the lift assembly 14 in a partially extended position, and FIG. 12 shows the lift assembly 14 in a fully retracted configuration. In this embodiment, a pulley 400 is rotatably coupled to the lift assembly 14 such that it rotates about the end axis 170. A pulley 402 is rotatably coupled to the lift assembly 14 such that it rotates about the end axis 160. Pulleys 404, 406, and 408 are rotatably coupled to the lift assembly 14 such that they rotate about each of the end axis 150, the end axis 152, and the end axis 154 on the same side of the lift assembly 14 as the end axis 160. Pulleys 410, 412, and 414 are rotatably coupled to the lift assembly 14 such that they rotate about each of the end axis 150, the end axis 152, and the end axis 154 on the same side of the lift assembly 14 as the end axis 170. Each of these pulleys are centered about their respective axes.

The cable 212 extends from the drum assembly 230 and around each of the pulleys, and an end of the cable 212 is fixed to the inner arms 140 at the end axis 190. A first strand, shown as motor strand 450, extends from the drum assembly 230 to the pulley 400. The cable 212 extends around the pulley 400 and forms a second strand, shown as horizontal strand 452, extending between the pulley 400 and the pulley 402. A third strand, shown as horizontal strand 454 extends back from the pulley 402 to the pulley 400. The horizontal strand 452 and the horizontal strand 454 each extend substantially horizontally. The horizontal strand 452 is positioned above the horizontal strand 454. The horizontal strand 452 and the horizontal strand 454 cooperate to form a first loop.

A fourth strand, shown as angled strand 456, extends from the pulley 400 to the pulley 404. The cable 212 extends around the pulley 404 and forms a fifth strand, shown as horizontal strand 458, extending between the pulley 404 and the pulley 410. A sixth strand, shown as horizontal strand 460 extends back from the pulley 410 to the pulley 404. The horizontal strand 458 and the horizontal strand 460 each extend substantially horizontally. The horizontal strand 458 is positioned above the horizontal strand 460. The horizontal strand 458 and the horizontal strand 460 cooperate to form a second loop.

A seventh strand, shown as angled strand 462, extends from the pulley 404 to the pulley 412. The cable 212 extends around the pulley 412 and forms an eighth strand, shown as horizontal strand 464, extending between the pulley 412 and the pulley 406. A ninth strand, shown as horizontal strand 466 extends back from the pulley 406 to the pulley 412. The horizontal strand 464 and the horizontal strand 466 each extend substantially horizontally. The horizontal strand 464 is positioned above the horizontal strand 466. The horizontal strand 464 and the horizontal strand 466 cooperate to form a third loop.

A tenth strand, shown as angled strand 468, extends from the pulley 412 to the pulley 408. The cable 212 extends around the pulley 408 and forms an eleventh strand, shown as horizontal strand 470, extending between the pulley 408 and the pulley 414. A twelfth strand, shown as horizontal strand 472 extends back from the pulley 414 to the pulley 408. The horizontal strand 470 and the horizontal strand 472 each extend substantially horizontally. The horizontal strand 470 is positioned above the horizontal strand 472. The horizontal strand 470 and the horizontal strand 472 cooperate to form a fourth loop. A thirteenth strand, shown as fixed strand 474, extends from the pulley 408 to the inner arm 140. The fixed strand 474 is fixed to the inner arm 140 along the end axis 190. In other embodiments, the fixed strand 474 is fixed elsewhere along the inner arm 140.

When the cable 212 is tensioned by the drum assembly 230, the cable 212 imparts forces on the pulleys in the direction of the cable 212. Accordingly, the directions of the forces on the pulleys can be visualized by observing the orientations of the strands of the cables 212. Referring to FIG. 11, when the lift assembly 14 is partially extended, the fixed strand 474 imparts a downward and longitudinally inward force on the inner arms 140 at the end axis 190.

The fixed strand 474 imparts an upward and longitudinally inward force on the pulley 408. The angled strand 468 imparts a downward and longitudinally inward force on the pulley 408. The upward and downward components of the forces on the pulley 408 partially or completely cancel one another such that the net force of the angled strands on the pulley 310 is a substantially longitudinally inward force. The angled strands 468, 462, and 456 impart similar forces on the pulley 412 and the pulley 404.

The horizontal strand 470 and the horizontal strand 472 each impart longitudinally inward forces on the pulley 408 and the pulley 414. Accordingly, the net forces on the pulley 408 and the pulley 414 are substantially longitudinally inward forces. The horizontal strands 458, 460, 464, and 466 impart similar forces on the pulley 404, the pulley 410, the pulley 406, and the pulley 412.

The angled strand 456 imparts an upward and longitudinally inward force on the pulley 400. The horizontal strand 452 and the horizontal strand 454 each impart longitudinally inward forces on the pulley 400 and the pulley 402. Depending upon the position on the drum assembly 230, the motor strand 450 may impart a longitudinally inward and/or downward force on the pulley 400.

The net forces on the pulleys 400, 402, 404, 410, 406, 412, 408, and 414 and on the inner arms 140 are directed at least partially longitudinally inward, driving these pulleys and the end axis 190 toward the vertical center plane 199. Because these pulleys and the end axis 190 are longitudinally offset from the vertical center plane 199, the tension in the cable 212 brings the pulleys and the end axis 190 closer to the vertical center plane 199. This forces the lift assembly 14 to extend, raising the platform 16.

In some embodiments, additional loops of the cable 212 may be added between one or more adjacent pulleys. In some embodiments, the number of loops between the pulleys increases for each consecutive lower scissor layer. By way of example, the actuator assembly 200 may include one loop of the cable 212 between the pulley 408 and the pulley 414, two loops of the cable 212 between the pulley 406 and the pulley 412, three loops of the cable 212 between the pulley 404 and the pulley 410, and four loops of the cable 212 between the pulley 402 and the pulley 400. Such an arrangement may facilitate providing forces to the scissor layers that scale with the loads on the scissor layers.

Referring to FIGS. 13 and 14, the actuator assembly 200 is shown according to a third embodiment. FIG. 13 shows the lift assembly 14 in a partially extended position, and FIG. 14 shows the lift assembly 14 in a fully retracted configuration. In this embodiment, a pulley 500 is rotatably coupled to the lift assembly 14 such that it rotates about the end axis 160. Pulleys 502, 504, and 506 are each rotatably coupled to the lift assembly 14 such that they rotate about the middle axis 114, the middle axis 124, and the middle axis 134, respectively. Pulleys 508, 510, and 512 are rotatably coupled to the lift assembly 14 such that they rotate about each of the end axis 150, the end axis 152, and the end axis 154 on the same side of the lift assembly 14 as the end axis 160, respectively. Each of these pulleys are centered about their respective axes.

The cable 212 extends from the drum assembly 230 and around each of the pulleys, and an end of the cable 212 is fixed to the inner arms 130 and the outer arms 142 at the end axis 154 opposite the end axis 160. A first strand, shown as motor strand 550, extends from the drum assembly 230 to the pulley 500. A second strand, shown as angled strand 552, extends from the pulley 500 to the pulley 502. A third strand, shown as angled strand 554, extends from the pulley 502 to the pulley 508. A fourth strand, shown as angled strand 556, extends from the pulley 508 to the pulley 504. A fifth strand, shown as angled strand 558, extends from the pulley 504 to the pulley 510. A sixth strand, shown as angled strand 560, extends from the pulley 510 to the pulley 506. A seventh strand, shown as angled strand 562, extends from the pulley 506 to the pulley 512. An eighth strand, shown as fixed strand 564, extends from the pulley 512 to the inner arm 130 and/or the outer arm 142. The fixed strand 564 is fixed to the inner arm 130 and the outer arm 142 along the end axis 154. In other embodiments, the fixed strand 564 is fixed elsewhere along the inner arm 130 or the outer arm 142.

When the cable 212 is tensioned by the drum assembly 230, the cable 212 imparts forces on the pulleys in the direction of the cable 212. Accordingly, the direction of the forces on the pulleys can be visualized by observing the orientations of the strands of the cables 212. Referring to FIG. 13, when the lift assembly 14 is partially extended, the fixed strand 564 imparts a primarily horizontal, longitudinally inward force on the outer arms 142 and the inner arms 130 at the end axis 154 and on the pulley 512. The angled strand 562 imparts a downward and longitudinally inward force on the pulley 512. Accordingly, the net force on the pulley 512 is a primarily longitudinally inward force.

The angled strand 562 imparts an upward and longitudinally outward force on the pulley 506. The angled strand 560 imparts a downward and longitudinally outward force on the pulley 506. The upward and downward components of the forces on the pulley 506 partially or completely cancel one another such that the net force on the pulley 506 is a substantially longitudinally outward force. The angled strands 552, 554, 556, and 558 impart similar forces on the pulley 502 and the pulley 504.

The angled strand 560 imparts an upward and longitudinally inward force on the pulley 510. The angled strand 558 imparts a downward and longitudinally inward force on the pulley 510. The upward and downward components of the forces on the pulley 510 partially or completely cancel one another such that the net force on the pulley 510 is a substantially longitudinally inward force. The angled strands 554 and 556 impart similar forces on the pulley 508.

The angled strand 552 imparts an upward and longitudinally inward force on the pulley 500. Depending upon the position on the drum assembly 230, the motor strand 550 may impart a longitudinally inward and/or downward force on the pulley 500.

The net forces on the pulley 500, the pulley 508, the pulley 510, and the pulley 512, the inner arms 130, and the outer arms 142 are directed at least partially longitudinally inward, driving these pulleys and the end axis 154 toward the vertical center plane 199. Because these pulleys and the end axis 154 are longitudinally offset from the vertical center plane 199, the tension in the cable 212 brings the pulleys and the end axis 154 closer to the vertical center plane 199. This forces the lift assembly 14 to extend, raising the platform 16.

Referring to FIGS. 15 and 16, the actuator assembly 200 is shown according to a fourth embodiment. FIG. 15 shows the lift assembly 14 in a partially extended position, and FIG. 16 shows the lift assembly 14 in a fully retracted configuration. In this embodiment, a pulley 600 is rotatably coupled to the lift assembly 14 such that it rotates about the end axis 160. Pulleys 602, 604, and 606 are each rotatably coupled to the lift assembly 14 such that they rotate about the end axis 170, the end axis 150, and the end axis 152 opposite the end axis 160, respectively. Pulleys 608, 610, and 612 are rotatably coupled to the lift assembly 14 such that they rotate about each of the end axis 150, the end axis 152, and the end axis 154 on the same side of the lift assembly 14 as the end axis 160, respectively. Each of these pulleys are centered about their respective axes.

The cable 212 extends from the drum assembly 230 and around each of the pulleys, and an end of the cable 212 is fixed to the inner arms 130 and the outer arms 142 at the end axis 154 opposite the end axis 160. A first strand, shown as motor strand 650, extends from the drum assembly 230 to the pulley 600. A second strand, shown as horizontal strand 652, extends from the pulley 600 to the pulley 602. A third strand, shown as angled strand 654, extends from the pulley 602 to the pulley 608. A fourth strand, shown as horizontal strand 656, extends from the pulley 608 to the pulley 604. A fifth strand, shown as angled strand 658, extends from the pulley 604 to the pulley 610. A sixth strand, shown as horizontal strand 660, extends from the pulley 610 to the pulley 606. A seventh strand, shown as angled strand 662, extends from the pulley 606 to the pulley 612. An eighth strand or horizontal strand, shown as fixed strand 664, extends from the pulley 612 to the inner arm 130 and/or the outer arm 142. The fixed strand 664 is fixed to the inner arm 130 and the outer arm 142 along the end axis 154. In other embodiments, the fixed strand 664 is fixed elsewhere along the inner arm 130 or the outer arm 142.

When the cable 212 is tensioned by the drum assembly 230, the cable 212 imparts forces on the pulleys in the direction of the cable 212. Accordingly, the directions of the forces on the pulleys can be visualized by observing the orientations of the strands of the cables 212. Referring to FIG. 15, when the lift assembly 14 is partially extended, the fixed strand 664 imparts a primarily horizontal, longitudinally inward force on the outer arms 142 and the inner arms 130 at the end axis 154 and on the pulley 612. The angled strand 662 imparts a downward and longitudinally inward force on the pulley 512. Accordingly, the net force on the pulley 512 is a primarily longitudinally inward force.

The angled strand 662 imparts an upward and longitudinally inward force on the pulley 606. The horizontal strand 660 imparts a primarily horizontal, longitudinally inward force on the pulley 606. The angled strands 654 and 658 and the horizontal strands 652 and 656 impart similar forces on the pulley 602 and the pulley 604. The horizontal strand 660 imparts a primarily horizontal, longitudinally inward force on the pulley 610. The angled strand 658 imparts a downward and longitudinally inward force on the pulley 610. The angled strand 654 and the horizontal strand 656 impart similar forces on the pulley 608.

The horizontal strand 652 imparts a primarily horizontal, longitudinally inward force on the pulley 600. Depending upon the position on the drum assembly 230, the motor strand 650 may impart a longitudinally inward and/or downward force on the pulley 600.

The net forces on the pulleys 600, 602, 604, 606, 608, 610, and 612, the inner arms 130, and the outer arms 142 are directed at least partially longitudinally inward, driving these pulleys and the end axis 154 toward the vertical center plane 199. Because these pulleys and the end axis 154 are longitudinally offset from the vertical center plane 199, the tension in the cable 212 brings the pulleys and the end axis 154 closer to the vertical center plane 199. This forces the lift assembly 14 to extend, raising the platform 16.

Although specific cable and pulley arrangements are shown herein, it should be understood that other cable and pulley arrangements are within the scope of this disclosure. Any of the pulley and cable arrangements shown and/or described herein as being coupled to a particular scissor layer may be coupled to other scissor layers. By way of example, the pulley 512 shown in FIG. 13 may be centered about the end axis 180, and the fixed strand 564 may extend from the pulley 512 to the axis 190.

In other embodiments, the pulleys are positioned offset from the end and middle axes. By way of example, as an alternative to the embodiment shown in FIG. 8, the pulley 300 may be moved upward along the inner arms 110 between the end axis 160 and the middle axis 114, and the pulley 302 may be moved upward along the outer arms 112 between the end axis 170 and the middle axis 114. In such an embodiment, the actuator assembly 200 may function similarly to the embodiment shown in FIG. 8. Generally, the actuator assembly 200 may be arranged such that at least one pulley set (e.g., a pair of pulleys that are directly coupled by one or more strands of the cable 212) includes pulleys that are longitudinally offset from one another. Those pulleys may be arranged on opposite sides of the vertical center plane 199 or on the same side of the vertical center plane 199. The pulleys of the pulley set may be coupled to the same scissor layer or to different scissor layers. Additionally, the pulleys of the pulley set may be coupled to the same scissor arm or to different scissor arms. By way of example, both pulleys of a pulley set may be coupled to the outer arms 132. By way of another example, one pulley of a pulley set may be coupled to the outer arms 132, and the other pulley may be coupled to the inner arms 130. By way of yet another example, one pulley of a pulley set may be coupled to the inner arms 130, and the other pulley may be coupled to the inner arms 120.

Any pulley set may include additional loops to facilitate increasing the force applied to the pulleys by the cable 212. By way of example, the pulley 300 and the pulley 302 may have multiple loops of the cable 212 (e.g., multiple horizontal strands 352 and horizontal strands 354) that extend around them to increase the force pulling the pulley 302 toward the pulley 304. By way of another example, the pulley 314 and the pulley 308 may have multiple loops of the cable 212 that extend around them to increase the force pulling the pulley 314 toward the pulley 308.

In other embodiments, the lift assembly 14 includes additional middle scissor layers. The actuator assembly 200 can be easily adjusted to accommodate such lift assembly configurations by including additional pulleys and increasing the length of the cable 212. Such additional scissor layers may include any of the cable and pulley configurations disclosed herein. By way of example, the additional middle scissor layer may include pulleys and cable in a similar configuration to that of the pulley 312, the pulley 306, the pulley 314, the angled strand 360, and the angled strand 362 shown in FIG. 8. By way of another example, the additional middle scissor layer may include pulleys and cable in a similar configuration to that of the pulley 604, the pulley 608, the pulley 610, and the pulley 606, the horizontal strand 656, the angled strand 658, and the horizontal strand 660 shown in FIG. 15.

Figure 17:
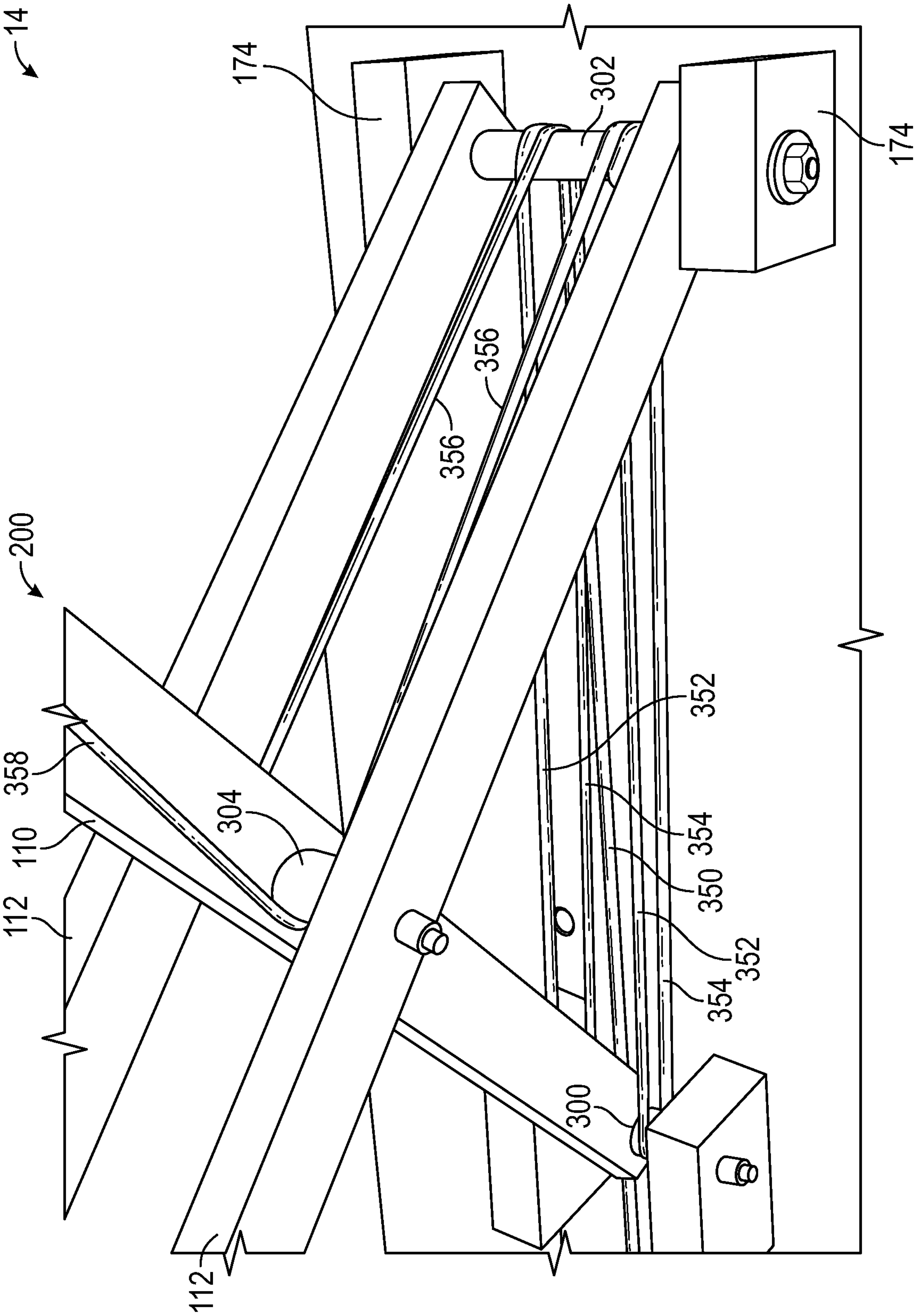
FIG. 17 is a perspective view of the lift assembly of FIG. 8.

In some embodiments, the actuator assembly 200 includes two or more cables 212. As shown in FIG. 17, the cables 212 may each be arranged in the same configuration (e.g., the configuration shown in FIG. 8), but positioned at different lateral locations throughout the lift assembly 14. Alternatively, the cables 212 may be arranged in different configurations. The actuator assembly 200 may include additional pulleys to facilitate the addition of the cables 212, or the pulleys may have increased widths to accommodate the cables 212. Each of the cables 212 may be coupled to the drum 232, and the drum 232 may have an increased width to accommodate the cables 212. Alternatively, the lift device 10 may include additional drums 232 to accommodate the cables 212. Each of the drums 232 may be driven by the same electric motor 234, or additional electric motors 234 may be included.

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms “exemplary” and “example” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

Also, the term “or” is used in its inclusive sense (and not in its exclusive sense) so that when used, for example, to connect a list of elements, the term “or” means one, some, or all of the elements in the list. Conjunctive language such as the phrase “at least one of X, Y, and Z,” unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A lift device, comprising:
- a base;
- a platform that is repositionable relative to the base between a fully raised position and a fully lowered position;
- a scissor assembly coupling the base to the platform, the scissor assembly including:
  - a scissor layer including a first scissor arm pivotally coupled to a second scissor arm;
  - a pulley coupled to the scissor layer;
  - a tensile member wrapped around the pulley; and
  - an actuator configured to vary a working length of the tensile member such that the first scissor arm rotates relative to the second scissor arm to move the platform relative to the base; and
- a booster positioned to engage a portion of the tensile member and apply an upward force on the scissor assembly when the platform is in the fully lowered position.

2. The lift device of claim 1, wherein the booster does not engage the portion of the tensile member when the platform is in the fully raised position.

3. The lift device of claim 1, wherein the booster does not apply the upward force on the scissor assembly when the platform is in the fully raised position.

4. The lift device of claim 1, wherein the pulley is a first pulley, wherein the scissor assembly further includes a second pulley and a third pulley, wherein the portion of the tensile member extends directly from the second pulley to the third pulley, and wherein the booster engages the portion of the tensile member between the second pulley and the third pulley when the platform is in the fully lowered position.

5. The lift device of claim 1, wherein the booster is coupled to the first scissor arm.

6. The lift device of claim 5, wherein the tensile member extends below the booster such that the upward force of the booster lifts the first scissor arm away from the portion of the tensile member.

7. The lift device of claim 5, wherein the pulley is a first pulley, wherein the scissor assembly further includes a second pulley coupled to the second scissor arm, and wherein the tensile member wraps around the second pulley.

8. The lift device of claim 7, wherein the scissor layer is a first scissor layer, wherein the scissor assembly further includes a second scissor layer including a third scissor arm pivotally coupled to a fourth scissor arm, and wherein an upper end of the first scissor arm is pivotally coupled to a lower end of the fourth scissor arm about an end axis.

9. The lift device of claim 8, wherein the pulley is coupled to the first scissor arm along the end axis such that the tensile member extends around the end axis.

10. The lift device of claim 9, wherein the first scissor arm is configured to rotate relative to the second scissor arm about a middle axis that extends laterally, and wherein the second pulley is positioned along the middle axis such that the tensile member extends around the middle axis.

11. The lift device of claim 1, wherein the pulley is a first pulley, wherein the scissor assembly further includes a second pulley coupled to the second scissor arm, wherein the tensile member wraps around the second pulley, and wherein the tensile member forms at least two loops around the first pulley and the second pulley.

12. The lift device of claim 1, wherein the first scissor arm is configured to rotate relative to the second scissor arm about a middle axis, and wherein the pulley is coupled to the first scissor arm at the middle axis.

13. The lift device of claim 12, wherein the pulley is a first pulley, wherein the scissor assembly further includes a second pulley coupled to the second scissor arm, wherein the first pulley is longitudinally offset from the second pulley, and wherein the actuator is configured to vary the working length of the tensile member to vary a longitudinal distance between the first pulley and the second pulley.

14. The lift device of claim 1, wherein the tensile member is fixedly coupled to the second scissor arm.

15. The lift device of claim 1, wherein the actuator includes a drum coupled to the tensile member and an electric motor coupled to the drum, and wherein the electric motor is configured to rotate the drum such that the tensile member wraps around the drum to vary the working length of the tensile member.

16. A lift device, comprising:

a base;

a platform that is repositionable relative to the base between a fully raised position and a fully lowered position;

a scissor assembly coupling the base to the platform, the scissor assembly including:

a scissor layer including a first scissor arm pivotally coupled to a second scissor arm;

a pulley coupled to the scissor layer;

a tensile member wrapped around the pulley; and an actuator configured to vary a working length of the tensile member such that the first scissor arm rotates relative to the second scissor arm to move the platform relative to the base; and a booster positioned to apply an upward force on the scissor assembly when the platform is in the fully lowered position, wherein the booster is configured such that a magnitude of the upward force decreases as the platform moves from the fully lowered position toward the fully raised position.

17. The lift device of claim 16, wherein the booster does not apply the upward force on the scissor assembly when the platform is in the fully raised position.

18. The lift device of claim 16, wherein the booster is positioned to engage at least one of (a) the first scissor arm or (b) a portion of the tensile member to apply the upward force.

19. The lift device of claim 16, wherein the booster is coupled to the first scissor arm.

* * * * *